United States Patent
Harel

(10) Patent No.: US 10,080,152 B2
(45) Date of Patent: *Sep. 18, 2018

(54) SYSTEMS AND METHODS FOR DETERMINING ASYMMETRIC DOWNLINK AND UPLINK PROPAGATION DELAYS IN A WIRELESS DISTRIBUTION SYSTEM (WDS) FOR MORE ACCURATELY DETERMINING PROPAGATION DELAY

(71) Applicant: Corning Optical Communications Wireless Ltd, Airport (IL)

(72) Inventor: Dror Harel, Hod Hasharon (IL)

(73) Assignee: Corning Optical Communications Wireless Ltd, Airport City (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/830,541

(22) Filed: Dec. 4, 2017

(65) Prior Publication Data

US 2018/0091991 A1 Mar. 29, 2018

Related U.S. Application Data

(63) Continuation of application No. 15/087,240, filed on Mar. 31, 2016.

(51) Int. Cl.
*H04W 24/08* (2009.01)
*H04B 17/364* (2015.01)

(52) U.S. Cl.
CPC .......... *H04W 24/08* (2013.01); *H04B 17/364* (2015.01)

(58) Field of Classification Search
CPC . H04W 24/08; H04W 24/06; H04W 56/0055; H04W 56/0065–56/009; H04W 24/00; H04B 17/364; H04B 17/0037; H04B 17/0047; H04B 17/0002; H04B 17/0017; H04B 17/002; H04B 17/0025; H04B 17/0027; H04B 17/003; H04B 17/004; H04B 17/0042; H04B 17/0062;
(Continued)

(56) References Cited

U.S. PATENT DOCUMENTS

2004/0152421 A1 8/2004 Erlenbach et al.
2007/0147562 A1 6/2007 Eidson
2011/0286361 A1 11/2011 Li et al.
(Continued)

OTHER PUBLICATIONS

International Search Report and Written Opinion PCT/IL2017/050283 dated Jun. 13, 2017.

*Primary Examiner* — Mark H Rinehart
*Assistant Examiner* — Kenneth P Hunt
(74) *Attorney, Agent, or Firm* — C. Keith Montgomery

(57) ABSTRACT

Embodiments of the disclosure relate to systems and methods for determining asymmetric downlink and uplink propagation delays in a wireless distribution system (WDS) for more accurately determining propagation delay. In this regard, a WDS is configured to determine both the separate downlink and uplink propagation delays between a central unit and a plurality of remote units. It is not presumed that the downlink propagation delay and the uplink propagation delay in the WDS are symmetric to provide a more accurate determination of propagation delay. Therefore, it is possible to determine the downlink and uplink propagation delays with improved accuracy, thus enabling more precise location identification in the WDS.

20 Claims, 17 Drawing Sheets

(58) Field of Classification Search
CPC ............ H04B 17/0067; H04B 17/0085; H04L 43/0852–43/0864; H04J 3/06–3/0697
USPC ........................................................ 370/252
See application file for complete search history.

(56) References Cited

U.S. PATENT DOCUMENTS

| | | |
|---|---|---|
| 2012/0263220 A1 | 10/2012 | Li et al. |
| 2013/0322872 A1 | 12/2013 | Jobert et al. |
| 2014/0050482 A1 | 2/2014 | Berlin et al. |
| 2015/0098351 A1 | 4/2015 | Zavadsky et al. |
| 2016/0065320 A1 | 3/2016 | Berlin et al. |
| 2016/0088581 A1 | 3/2016 | Lorenz et al. |
| 2017/0180070 A1 | 6/2017 | Ruffini et al. |
| 2017/0289827 A1* | 10/2017 | Harel .................. H04B 17/364 |

* cited by examiner

SYSTEMS AND METHODS FOR DETERMINING ASYMMETRIC DOWNLINK AND UPLINK PROPAGATION DELAYS IN A WIRELESS DISTRIBUTION SYSTEM (WDS) FOR MORE ACCURATELY DETERMINING PROPAGATION DELAY

CROSS REFERENCED APPLICATIONS

This applications claims the benefit of priority under 35 U.S.C. § 120 of U.S. application Ser. No. 15/087,240 filed on Mar. 31, 2016, the content of which is relied upon and incorporated herein by reference.

BACKGROUND

The disclosure relates generally to determining propagation delays in a wireless distribution system (WDS), such as a distributed antenna system (DAS) and, more particularly to determining downlink and uplink propagation delays that may be asymmetric.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of WDSs. WDSs include remote units configured to receive and transmit communications signals to client devices within the antenna range of the remote units. WDSs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a WDS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, the client devices 116 transmit the uplink communications signals 110U to signal source 108 via the remote units 104(1)-104(N), the communications medium 112, and the HEE 106. Accordingly, the uplink communications signals 110U may experience an uplink propagation delay when arriving at the signal source 108. The signal source 108 may be configured to accommodate for the uplink propagation delay associated with the uplink communications signals 110U by assigning timing advance(s) (TA(s)) to the client devices 116. In addition, a geo-location server 118 may be included in the WDS 102 to determine locations of the client devices 116 based on the uplink propagation delay.

As mentioned above, the communications medium 112 may be a non-wireless communications medium, such as an electrical conductor communications medium, or an optical fiber-based communications medium. As such, the uplink communications signals 110U may experience different propagation delays traveling through the communications medium 112 as opposed to a wireless medium. For example, the uplink communications signals 110U propagate wirelessly over the air at a speed of approximately 3.3 nanoseconds (ns) per meter (m) (3.3 ns/m). In contrast, if the communications medium 112 in the WDS 102 is an optical communications medium, the uplink communications signals 110U propagate in the WDS 102 over the uplink communications medium 110U at a speed of approximately five (5) ns per meter (5 ns/m). However, the signal source may not be aware of the WDS 102. As a result, if the signal source 108 assumes that the uplink communications signals 110U are received over a wireless communications medium while the uplink communications signal 110U is in fact received over a non-wireless communications medium, for example, the signal source 108 may end up assigning inappropriate TA(s) to the client devices 116. Likewise, the geo-location server 118 may also determine inaccurate locations for the client devices 116. Hence, it is desired to accurately determine downlink and uplink propagation delays associated with the communications medium 112.

No admission is made that any reference cited herein constitutes prior art. Applicant expressly reserves the right to challenge the accuracy and pertinency of any cited documents.

SUMMARY

Embodiments of the disclosure relate to systems and methods for determining asymmetric downlink and uplink propagation delays in a wireless distribution system (WDS) for more accurately determining propagation delay. In this regard, a WDS is configured to determine both the separate downlink and uplink propagation delays between a central unit and a plurality of remote units. It is not presumed that the downlink propagation delay and the uplink propagation delay in the WDS are symmetric to provide a more accurate determination of propagation delay. Therefore, it is possible to determine the downlink and uplink propagation delays with improved accuracy. In a non-limiting example, this allows more accurate localization techniques to be used for location identification in the WDS.

In this regard, in one embodiment, to measure the separate downlink and uplink propagation delays in the WDS for more accurately determining propagation delay, a signal source is provided to distribute a signal in different signal paths of the WDS. For example, the signal source may be provided in a central unit of the WDS to avoid providing a signal source in each of the remote units in the WDS. In this example, the signal source is configured to distribute the signal in the downlink direction to each of the remote units. However, if the propagation delay of the signal distributed by the single signal source in the central unit in the downlink direction was measured at the remote unit receiving the signal, only one propagation delay value would be determinable between the central unit and the remote unit where the propagation delay is measured. However, as discussed above, the propagation delay for the downlink signal path for each remote unit may be different from the propagation delay for the uplink signal path for a particular remote unit. Thus, in embodiments disclosed herein, to determine the separate downlink and uplink propagation delays for a particular remote unit, and by using the signal source in the central unit, the signal paths for two remote units are analyzed to determine the separate downlink and uplink propagation delays for each of the two remote units. This is because by involving two remote units in the analysis, the signal from one remote unit can be communicated from an antenna in one remote unit to an antenna in the other remote unit, thus allowing the signal to travel back to the central unit on the uplink path, and vice versa. In this regard, a pair of downlink and uplink propagation delays needs to be determined for each of the two (2) remote units, thus resulting in a total of four (4) propagation delays to be determined. To determine each of the 4 propagation delays between the central unit and the 2 remote units, a comparison of different propagation delays along two different signal paths can be made at the central unit and/or the remote unit to establish a propagation delay equation. Hence, it will require 4 propagation delay equations to determine the 4 propagation delays between the central unit and the 2 remote units. Thus, 4 propagation delays comparisons (i.e. equations) can be made for uplink and downlink propagation delays in the central unit and the two remote units. However, as discussed, for the signal to be propagated between the two remote units, another signal path and associated propagation delay is involved between the two antennas in the two remote units. Thus, in one example, five propagation delay comparisons (equations) are needed to solve five (5) propagation delays (downlink and uplink propagation delays for both remote units, and a delay between the remote units), to be able to then solve for the separate downlink and uplink propagation delays for each remote unit.

One embodiment of the disclosure relates to a WDS. The WDS comprises at least one first remote unit comprising a first transmit (TX) antenna and a first receive (RX) antenna. The WDS also comprises at least one second remote unit comprising a second TX antenna and a second RX antenna. The WDS also comprises a central unit communicatively coupled to the at least one first remote unit and the at least one second remote unit. The central unit comprises an input/output (I/O) interface configured to receive a modulated signal from a signal source. The WDS also comprises a controller configured to determine a first downlink propagation delay between the I/O interface and the at least one first remote unit, a first uplink propagation delay between the I/O interface and the at least one first remote unit, a second downlink propagation delay between the I/O interface and the at least one second remote unit, a second uplink propagation delay between the I/O interface and the at least one second remote unit, and a remote unit-to-remote unit (RU-to-RU) propagation delay from the first TX antenna to the second RX antenna and from the second TX antenna to the first RX antenna.

Another embodiment of the disclosure relates to a method for determining propagation delays from a central unit to at least one first remote unit and at least one second remote unit in a WDS. The method comprises determining a first downlink propagation delay between an I/O interface in the central unit and the at least one first remote unit. The method also comprises determining a first uplink propagation delay between the I/O interface in the central unit and the at least one first remote unit. The method also comprises determining a second downlink propagation delay between the I/O interface in the central unit and the at least one second remote unit. The method also comprises determining a second uplink propagation delay between the I/O interface in the central unit and the at least one second remote unit. The method also comprises determining an RU-to-RU propagation delay between the at least one first remote unit and the at least one second remote unit.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Figure 1:
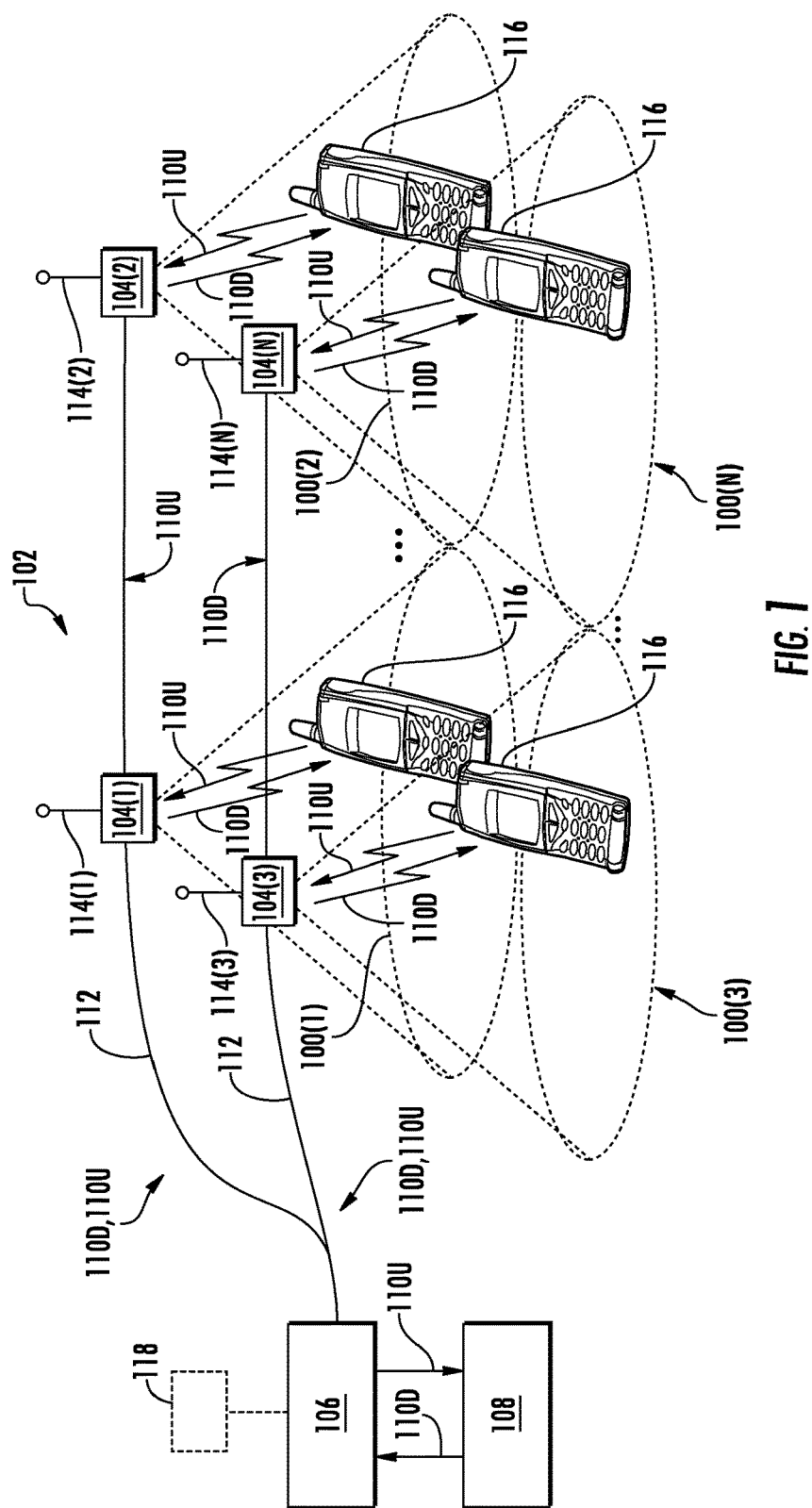
FIG. 1 is a schematic diagram of an exemplary wireless distribution system (WDS)

Embodiments of the disclosure relate to systems and methods for determining asymmetric downlink and uplink propagation delays in a wireless distribution system (WDS) for more accurately determining propagation delay. In this regard, a WDS is configured to determine both the separate downlink and uplink propagation delays between a central unit and a plurality of remote units. It is not presumed that the downlink propagation delay and the uplink propagation delay in the WDS are symmetric to provide a more accurate determination of propagation delay. Therefore, it is possible to determine the downlink and uplink propagation delays with improved accuracy. In a non-limiting example, this allows more accurate localization techniques to be used for location identification in the WDS.

In this regard, in one embodiment, to measure the separate downlink and uplink propagation delays in the WDS for more accurately determining propagation delay, a signal source is provided to distribute a signal in different signal paths of the WDS. For example, the signal source may be provided in a central unit of the WDS to avoid providing a signal source in each of the remote units in the WDS. In this example, the signal source is configured to distribute the signal in the downlink direction to each of the remote units. However, if the propagation delay of the signal distributed by the single signal source in the central unit in the downlink direction was measured at the remote unit receiving the signal, only one propagation delay value would be determinable between the central unit and the remote unit where the propagation delay is measured. However, as discussed above, the propagation delay for the downlink signal path for each remote unit may be different from the propagation delay for the uplink signal path for a particular remote unit. Thus, in embodiments disclosed herein, to determine the separate downlink and uplink propagation delays for a particular remote unit, and by using the signal source in the central unit, the signal paths for two remote units are analyzed to determine the separate downlink and uplink propagation delays for each of the two remote units. This is because by involving two remote units in the analysis, the signal from one remote unit can be communicated from an antenna in one remote unit to an antenna in the other remote unit, thus allowing the signal to travel back to the central unit on the uplink path, and vice versa. In this regard, a pair of downlink and uplink propagation delays needs to be determined for each of the two (2) remote units, thus resulting in a total of four (4) propagation delays to be determined. To determine each of the 4 propagation delays between the central unit and the 2 remote units, a comparison of different propagation delays along two different signal paths can be made at the central unit and/or the remote unit to establish a propagation delay equation. Hence, it will require 4 propagation delay equations to determine the 4 propagation delays between the central unit and the 2 remote units. Thus, 4 propagation delays comparisons (i.e. equations) can be made for uplink and downlink propagation delays in the central unit and the two remote units. However, as discussed, for the signal to be propagated between the two remote units, another signal path and associated propagation delay is involved between the two antennas in the two remote units. Thus, in one example, five propagation delay comparisons (equations) are needed to solve five (5) propagation delays (downlink and uplink propagation delays for both remote units, and a delay between the remote units), to be able to then solve for the separate downlink and uplink propagation delays for each remote unit.

Figure 2:
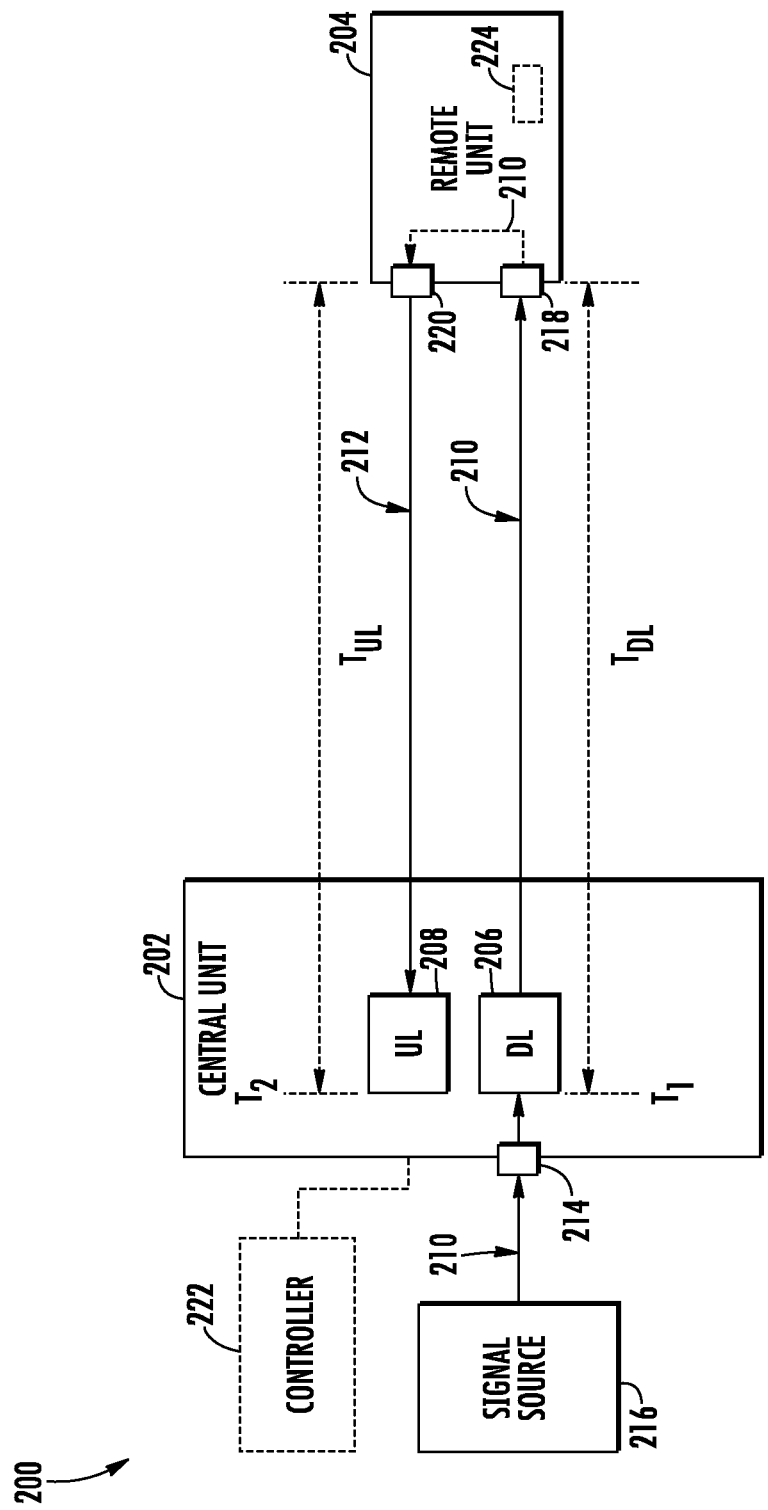
FIG. 2 is a schematic diagram of an exemplary WDS configured to measure a downlink propagation delay and an uplink propagation delay between a central unit and at least one remote unit by assuming that the downlink propagation delay and the uplink propagation delay are symmetric.

Before discussing examples of determining downlink and uplink propagation delays in a WDS without assuming that downlink and uplink propagation delays are symmetric starting at FIG. 3, an overview of a conventional method for determining symmetric downlink and uplink propagation delays in a WDS is first discussed with reference to FIG. 2. In this regard, FIG. 2 is a schematic diagram of an exemplary WDS 200 configured to measure a downlink propagation delay ($T_{DL}$) and an uplink propagation delay ($T_{UL}$) between a central unit 202 and at least one remote unit 204 by assuming that the downlink propagation delay ($T_{DL}$) and the uplink propagation delay ($T_{UL}$) are symmetric. The central unit 202 includes a downlink circuit 206 and an uplink circuit 208 configured to transmit a downlink signal 210 to the remote unit 204 and receive an uplink signal 212 from the remote unit 204, respectively. The central unit 202 includes an input/output (I/O) interface 214 that is communicatively coupled to a signal source 216 to receive the downlink signal 210. The remote unit 204 includes a downlink interface 218 and an uplink interface 220 that are communicatively coupled to the downlink circuit 206 and the uplink circuit 208, respectively. In this regard, the downlink propagation delay ($T_{DL}$) corresponds to propagation delay between the I/O interface 214 and the downlink interface 218. The uplink propagation delay ($T_{UL}$) corresponds to propagation delay between the uplink interface 220 and the I/O interface 214.

To determine the downlink propagation delay ($T_{DL}$) and the uplink propagation delay ($T_{UL}$), in a non-limiting example, a controller 222 is provided in the WDS 200 and is communicatively coupled to the central unit 202. The controller 222 configures the downlink circuit 206 to transmit the downlink signal 210 to the downlink interface 218 in the remote unit 204. A remote unit controller 224 may be provided in the remote unit 204 to transmit the downlink signal 210 received from the downlink interface 218 as the uplink signal 212 via the uplink interface 220. The controller 222 is configured to determine a total propagation delay $T_{TOTAL}$ that starts at time $T_1$ when the downlink circuit 206 receives the downlink signal 210, and ends at time $T_2$ when the uplink circuit 208 receives the uplink signal 212 ($T_{TOTAL}=T_2-T_1$). By assuming that the downlink propagation delay ($T_{DL}$) equals the uplink propagation delay ($T_{UL}$) and by further ignoring possible processing delays associated with the remote unit controller 224, the controller 222 determines both the downlink propagation delay ($T_{DL}$) and the uplink propagation delay ($T_{UL}$) as being equal to one-half of the $T_{TOTAL}$ ($T_{DL}=\frac{1}{2} T_{TOTAL}$, $T_{UL}=\frac{1}{2} T_{TOTAL}$).

However, in the WDS 200, the downlink signal 210 may travel a distance that is longer or shorter than a distance the uplink signal 212 travels. As a result, the downlink propagation delay ($T_{DL}$) and the uplink propagation delay ($T_{UL}$) are determined based on the assumption that the downlink propagation delay ($T_{DL}$) and the uplink propagation delay ($T_{UL}$) are symmetric will no longer be accurate. As such, it may be desired to determine the downlink propagation delay ($T_{DL}$) and uplink propagation delay ($T_{UL}$) without assuming that the downlink propagation delay ($T_{DL}$) and the uplink propagation delay ($T_{UL}$) are equal. In this regard, FIG. 3 is a schematic diagram of an exemplary WDS 300 configured to determine downlink and uplink propagation delays in the WDS 300 without assuming that downlink propagation delay and uplink propagation delay are symmetric.

Figure 3:
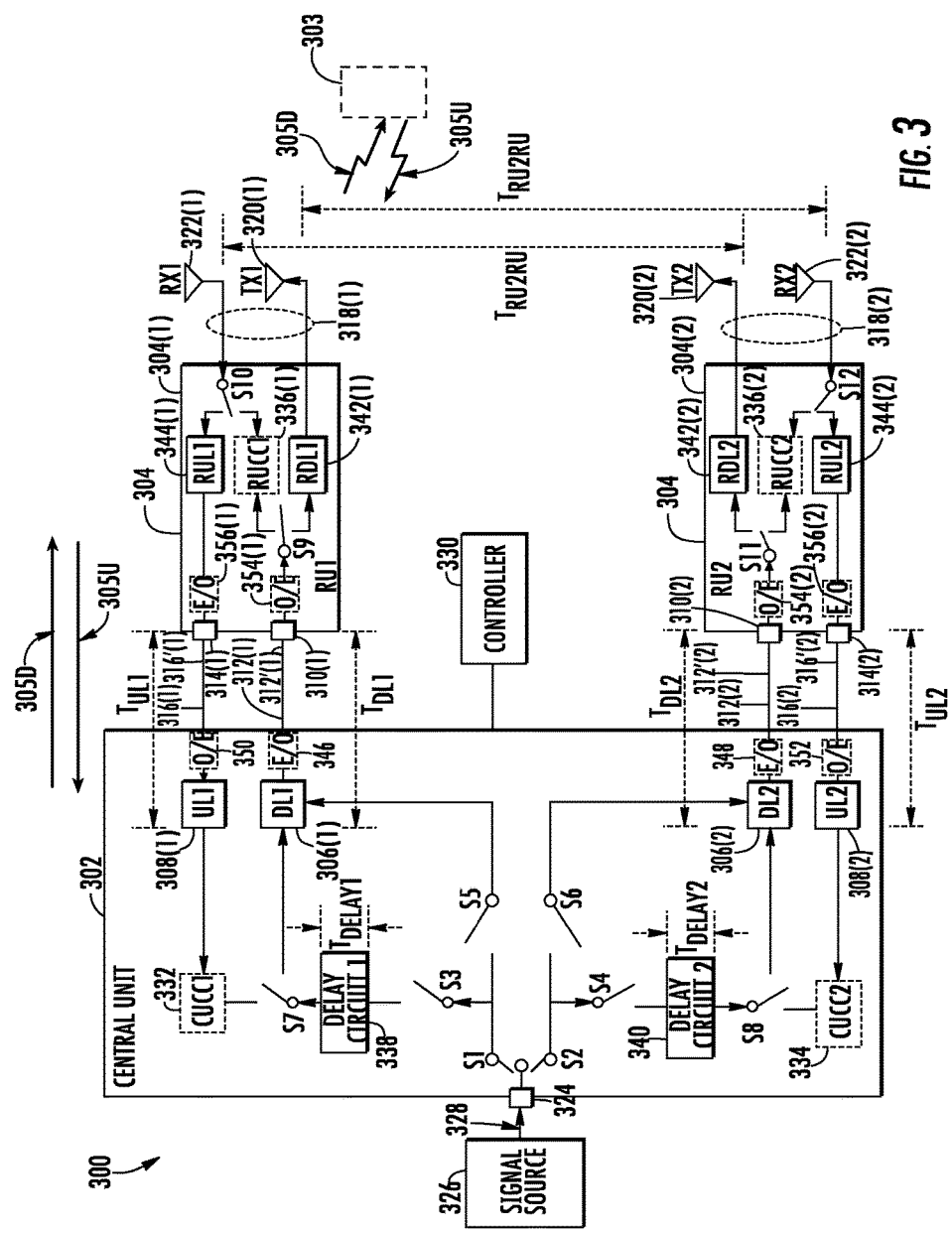
FIG. 3 is a schematic diagram of an exemplary WDS configured to determine downlink and uplink propagation delays in the WDS without assuming that downlink propagation delay and uplink propagation delay are symmetric.

With reference to FIG. 3, the WDS 300 includes a central unit 302, which is configured to provide communications services to one or more client devices 303 in the WDS 300. The WDS 300 is a distributed antenna system (DAS) in this example. The WDS 300 also includes at least one first remote unit 304(1), and at least one second remote unit 304(2). It shall be noted that the first remote unit 304(1) and the second remote unit 304(2) are referenced hereinafter as non-limiting examples merely to facilitate discussions and illustrations. The WDS 300 can include a plurality of remote units 304 that includes the first remote unit 304(1) and the second remote unit 304(2), which can be any of the remote units 304. The WDS 300 is configured to distribute downlink communications signals 305D from the central unit 302 to the remote units 304 to be distributed to the client devices 303. The central unit 302 is also configured to receive uplink communications signals 305U from the client devices 303 via the remote units 304 to be distributed to communications signal sources (e.g. base transceiver station (BTS), baseband unit (BBU), etc.) (not shown). It shall be appreciated that the configurations and operational principles discussed with reference to the first remote unit 304(1) and the second remote unit 304(2) are applicable to any of the reasonable number of remote units in the WDS 300.

The central unit 302 includes a first downlink circuit 306(1), a second downlink circuit 306(2), a first uplink circuit 308(1), and a second uplink circuit 308(2). In a non-limiting example, the first downlink circuit 306(1) and the second downlink circuit 306(2) can be configured to process the downlink communications signals 305D (e.g., frequency shift, analog to digital conversion, etc.) for distribution to the remote units 304(1), 304(2), respectively. Likewise, the first uplink circuit 308(1) and the second uplink circuit 308(2) can be configured to process the uplink communications signals 305U (e.g., frequency shift, digital to analog conversion, etc.) received from the remote units 304(1), 304(2), respectively. The first downlink circuit 306(1) is communicatively coupled to a first downlink interface 310(1) in the first remote unit 304(1) over a first downlink communications medium 312(1). The first uplink circuit 308(1) is communicatively coupled to a first uplink interface 314(1) in the first remote unit 304(1) over a first uplink communications medium 316(1). The second downlink circuit 306(2) is communicatively coupled to a second downlink interface 310(2) in the second remote unit 304(2) over a second downlink communications medium 312(2). The second uplink circuit 308(2) is communicatively coupled to a second uplink interface 314(2) in the second remote unit 304(2) over a second uplink communications medium 316(2).

The first remote unit 304(1) includes at least one first antenna 318(1) for transmitting the downlink communications signals 305D to the client devices 303 and receiving the uplink communications signals 305U from the client devices 303. In a non-limiting example, the at least one first antenna 318(1) includes a first transmit (TX) antenna 320(1) and a first receive (RX) antenna 322(1). The second remote unit 304(2) includes at least one second antenna 318(2) for transmitting the downlink communications signals 305D to the client devices 303 and receiving the uplink communications signals 305U from the client devices 303. In a non-limiting example, the at least one second antenna 318(2) includes a second TX antenna 320(2) and a second RX antenna 322(2). In a non-limiting example, both the first TX antenna 320(1) and the second TX antenna 320(2) can be configured to receive the uplink communications signals 305U from the client devices 303, as well.

The central unit 302 includes an I/O interface 324 that is communicatively coupled to a signal source 326 to receive a modulated signal 328. In a non-limiting example, the signal source 326 is a signal generator. Accordingly, the modulated signal 328 may be a downlink test signal received from the signal generator. In this regard, the modulated signal 328 may be analog modulated or digitally modulated to provide a distinguishable signal pattern. In a first non-limiting example, the signal source 326 is provided outside the central unit 302 and is configured to provide the modulated signal 328 to the I/O interface 324. In a second non-limiting example, the signal source 326 is provided inside the central unit 302 and is configured to provide the modulated signal 328 to the I/O interface 324.

According to previous discussions in FIG. 2, the downlink propagation delay and the uplink propagation delay determined based on the assumption that the downlink propagation delay and the uplink propagation delay are symmetric will no longer be accurate when the downlink signal 210 and the uplink signal 212 are communicated over different signal paths. As a result, it can hinder the ability of the central unit 202 to accurately determine locations of client devices. Further, it can also hinder the ability of the signal source 216 in determining accurate TA for the client devices. As such, it is desired to accurately determine the downlink and uplink propagations in the WDS 300 to enable accurate location identifications and TA assignments for the client devices 303. In the WDS 300, it is possible to determine a plurality of propagation delays between the central unit 302, the first remote unit 304(1), and the second remote unit 304(2) without assuming that downlink propagation delay and uplink propagation delay are symmetric. According to a non-limiting example discussed in more detail below, the WDS 300 is configured to determine a first downlink propagation delay ($T_{DL1}$) from the I/O interface 324 to the first downlink interface 310(1) and a first uplink propagation delay ($T_{UL1}$) from the first uplink interface 314(1) to the I/O interface 324. In a non-limiting example, by accurately determining the first downlink propagation delay and the first uplink propagation delay, it is possible to accurately determine locations and TAs for the client devices 303 communicating through the first remote unit 304(1). The WDS 300 is also configured to determine a second downlink propagation delay ($T_{DL2}$) from the I/O interface 324 to the second downlink interface 310(2) and a second uplink propagation delay ($T_{UL2}$) from the second uplink interface 314(2) to the I/O interface 324. In another non-limiting example, by accurately determining the second downlink propagation delay and the second uplink propagation delay, it is possible to accurately determine locations and TAs for the client devices 303 communicating through the second remote unit 304(2). In addition, the WDS 300 is configured to determine a remote unit-to remote unit (RU-to-RU) propagation delay ($T_{RU2RU}$) from the first TX antenna 320(1) to the second RX antenna 322(2) or from the second TX antenna 320(2) to the first RX antenna 322(1). In another non-limiting example, by determining the RU-to-RU propagation delay ($T_{RU2RU}$) between the first remote unit 304(1) and the second remote unit 304(2), it is possible to determine relative distances from the client devices 303 to the first remote unit 304(1) and the second remote unit 304(2), thus enabling more accurate location identification for the client devices 303 based on more sophisticated algorithms such as the triangulation algorithm. In contrast to the WDS 200 of FIG. 2, the WDS 300 is configured to determine the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) without assuming that the first downlink propagation delay ($T_{DL1}$) is equal to the first uplink propagation delay ($T_{UL1}$) and/or that the second downlink propagation delay ($T_{DL2}$) is equal to the second uplink propagation delay ($T_{UL2}$). As such, the first downlink propagation delay ($T_{DL1}$), the first uplink propagation delay ($T_{UL1}$), the second downlink propagation delay ($T_{DL2}$), and the second uplink propagation delay ($T_{UL2}$) are determined with improved precision to account for propagation delay variations associated with different communications mediums (e.g., wireless communications medium, optical communications medium, etc.). As a result, the signal source 326 is able to more accurately determine TAs for the client devices 303 in the WDS 300. As a result, the central unit 302 is able to improve accuracy of localization techniques used for location determination in the WDS 300 based on the first downlink propagation delay ($T_{DL1}$), the first uplink propagation delay ($T_{UL1}$), the second downlink propagation delay ($T_{DL2}$), the second uplink propagation delay ($T_{UL2}$), and the TAs determined by the signal source 326 to accommodate for downlink and uplink propagation delays in the WDS 300. Furthermore, by determining the RU-to-RU propagation delay ($T_{RU2RU}$) between the first remote unit 304(1), the second remote unit 304(2), and any other remote units in the WDS 300, it is possible to employ advanced location determination algorithms (e.g., triangulation algorithm) to determine location(s) of client device(s) in the WDS 300.

Figure 4:
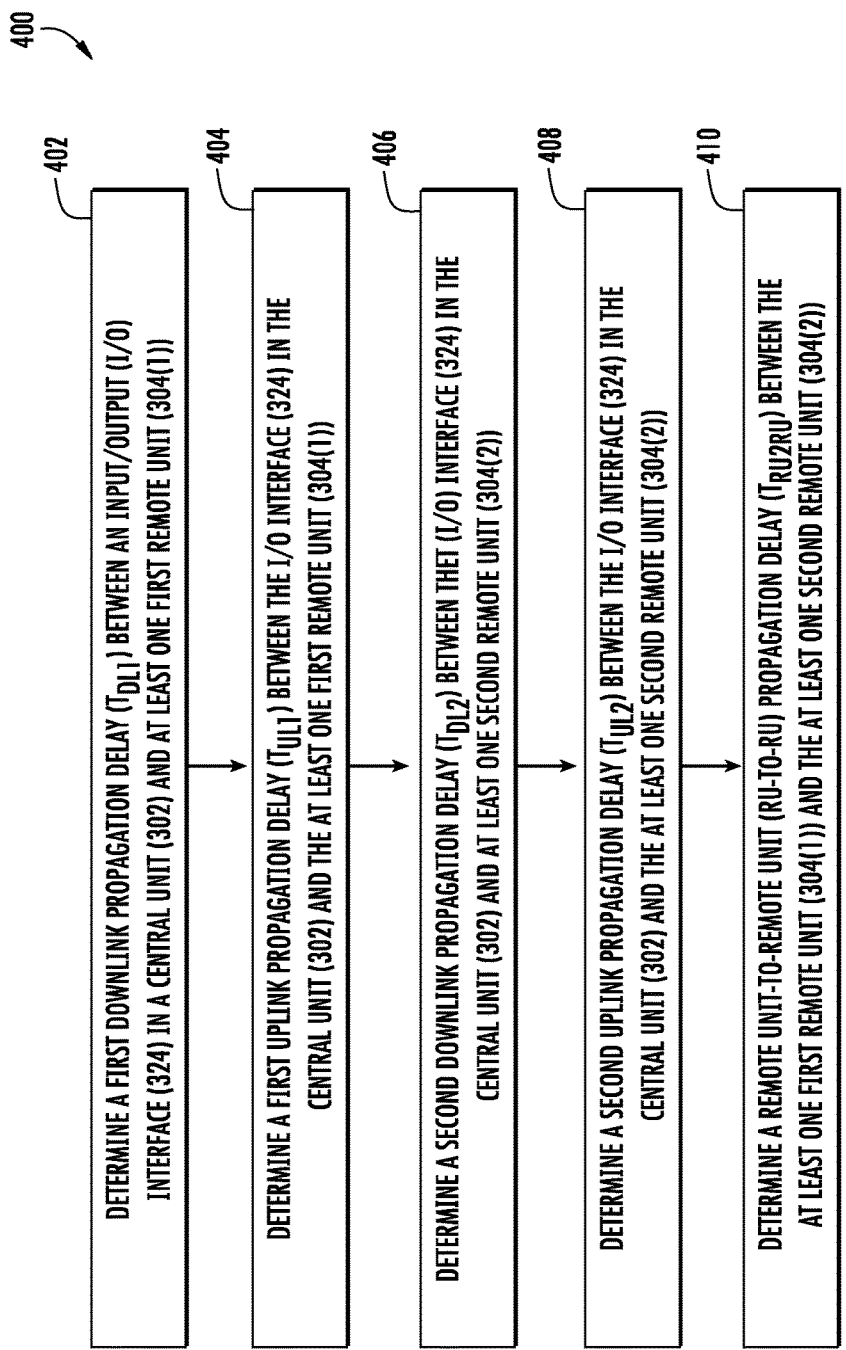
FIG. 4 is a flowchart of an exemplary high-level process for determining the downlink and uplink propagation delays in the WDS of FIG. 3.

With reference back to FIG. 3, to determine the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$), a controller 330 is provided in the WDS 300. The controller 330 is configured to determine the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) according to a process as discussed next in FIG. 4. In this regard, FIG. 4 is a flowchart of an exemplary high-level process 400 that can be employed by the controller 330 for determining downlink and uplink propagation delays in the WDS 300. With reference to FIG. 4, the controller 330 determines the first downlink propagation delay ($T_{DL1}$) between the I/O interface 324 in the central unit 302 and the first remote unit 304(1) (block 402). The controller 330 also determines the first uplink propagation delay ($T_{UL1}$) between the I/O interface 324 in the central unit 302 and the first remote unit 304(1) (block 404). The controller 330 also determines the second downlink propagation delay ($T_{DL2}$) between the I/O interface 324 in the central unit 302 and the second remote unit 304(2) (block 406). The controller 330 also determines the second uplink propagation delay ($T_{UL2}$) between the I/O interface 324 in the central unit 302 and the second remote unit 304(2) (block 408). The controller 330 also determines the RU-to-RU propagation delay ($T_{RU2RU}$) between the first remote unit 304(1) and the second remote unit 304(2) (block 410). In this regard, the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) are treated as five variables to be determined. To mathematically determine the five variables, it is necessary to establish five different propagation delay equations. Each of the five propagation delay equations includes at least one of the five variables selected among the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$). As is further discussed later in FIGS. 6-10, the controller 330 is configured to determine the five propagation delay equations based on ten signal paths. The controller 330 is further configured to determine the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) by mathematically solving the five propagation delay equations. As such, the controller 330 may be configured to determine locations of the client devices 303 in the WDS 300.

In a non-limiting example, the controller 330 is communicatively coupled to the central unit 302. In addition, the controller 330 may also be communicatively coupled to the first remote unit 304(1) and the second remote unit 304(2) either directly or via the central unit 302. The controller 330 can be configured to determine the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) based on a plurality of comparator circuits. In non-limiting examples discussed hereinafter, the plurality of comparator circuits includes a first central unit comparator circuit (CUCC1) 332, a second central unit comparator circuit (CUCC2) 334, a first remote unit comparator circuit (RUCC1) 336(1), and a second remote unit comparator circuit (RUCC2) 336(2). The first central unit comparator circuit 332 and the second central unit comparator circuit 334 are provided in the central unit 302. The first remote unit comparator circuit 336(1) and the second remote unit comparator circuit 336(2) are provided in the first remote unit 304(1) and the second remote unit 304(2), respectively.

Each of the first central unit comparator circuit 332, the second central unit comparator circuit 334, the first remote unit comparator circuit 336(1), and the second remote unit comparator circuit 336(2) in the WDS 300 is configured to receive two modulated signals via two distinct signal paths and determine whether the two modulated signals experience equal propagation delays over the two distinct signal paths. In this regard, FIG. 5 is a schematic diagram of an exemplary comparator circuit 500, which can be any of the first central unit comparator circuit 332, the second central unit comparator circuit 334, the first remote unit comparator circuit 336(1), and the second remote unit comparator circuit 336(2) of FIG. 3, configured to determine whether a first modulated signal 502 and a second modulated signal 504 have experienced equal propagation delays when arriving at the comparator circuit 500.

Figure 5:
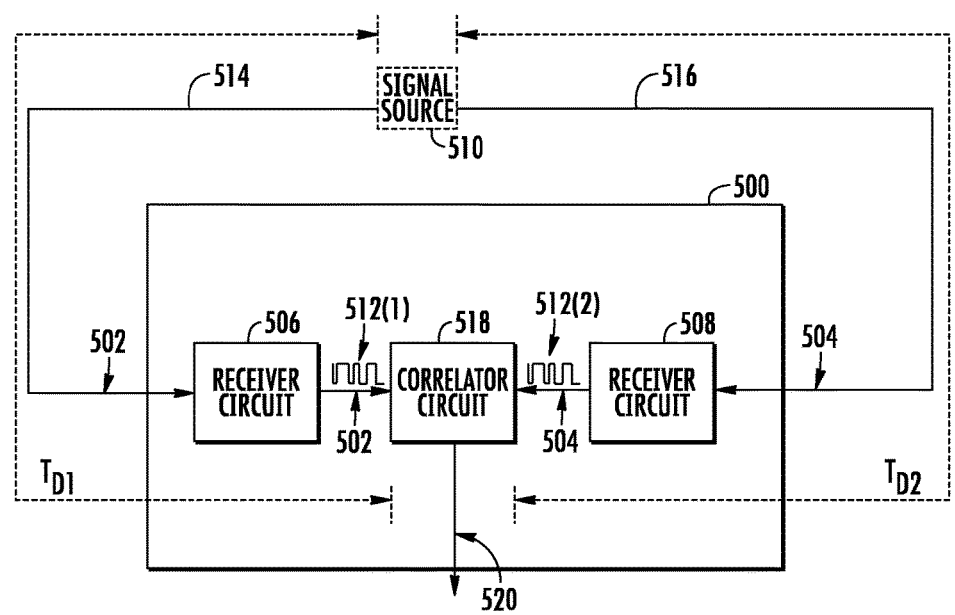
FIG. 5 is a schematic diagram of an exemplary comparator circuit that may be employed in the WDS of FIG. 3 to define propagation delay equations for determining the downlink and uplink propagation delays in the WDS by examining whether a first modulated signal and a second modulated signal have experienced equal propagation delays when arriving at the comparator circuit.

With reference to FIG. 5, the comparator circuit 500 includes a first receiver circuit 506 for receiving the first modulated signal 502 and a second receiver circuit 508 for receiving the second modulated signal 504. The first modulated signal 502 and the second modulated signal 504 are analog or digitally modulated with identical information at a signal source 510, which can be the signal source 326 of FIG. 3, for example. In this regard, both the first modulated signal 502 and the second modulated signal 504 have signal patterns 512(1), 512(2) that are identical when leaving the signal source 510. The first modulated signal 502 and the second modulated signal 504 propagate from the signal source 510 to the comparator circuit 500 via a first signal path 514 and a second signal path 516, respectively. In a non-limiting example, the first signal path 514 is different from the second signal path 516. As such, the first modulated signal 502 experiences a first propagation delay ($T_{D1}$) when arriving at the comparator circuit 500 over the first signal path 514. The second modulated signal 504 experiences a second propagation delay ($T_{D2}$) when arriving at the comparator circuit 500 over the second signal path 516.

The comparator circuit 500 includes a correlator circuit 518. The correlator circuit 518 is configured to compare the signal pattern 512(1) of the first modulated signal 502 with the signal pattern 512(2) of the second modulated signal 504 to determine whether the first propagation delay ($T_{D1}$) and the second propagation delay ($T_{D2}$) are equal. The correlator circuit 518 determines that the first propagation delay ($T_{D1}$) equals the second propagation delay ($T_{D2}$) ($T_{D1}=T_{D2}$) if the signal pattern 512(1) of the first modulated signal 502 matches the signal pattern 512(2) of the second modulated signal 504. In this regard, the correlator circuit 518 is able to determine that a propagation delay equation ($T_{D1}=T_{D2}$) exists between the first signal path 514 and the second signal path 516.

In contrast, the correlator circuit 518 determines that the first modulated signal 502 experiences longer propagation delay than the second modulated signal 504 ($T_{D1}>T_{D2}$) if the signal pattern 512(1) of the first modulated signal 502 lags the signal pattern 512(2) of the second modulated signal 504. Similarly, the correlator circuit 518 determines that the first modulated signal 502 experiences shorter propagation delay than the second modulated signal 504 ($T_{D1}<T_{D2}$) if the signal pattern 512(2) of the second modulated signal 504 lags the signal pattern 512(1) of the first modulated signal 502. In both cases, the correlator circuit 518 determines that a propagation delay equation does not exist between the first signal path 514 and the second signal path 516. In a non-limiting example, the correlator circuit 518 generates an indication signal 520 indicating whether the propagation delay equation ($T_{D1}=T_{D2}$) exists between the first signal path 514 and the second signal path 516. The correlator circuit 518 provides the indication signal 520 to the controller 330 of FIG. 3, for example.

With reference back to FIG. 3, the controller 330 configures two distinct signal paths for each of the first central unit comparator circuit 332, the second central unit comparator circuit 334, the first remote unit comparator circuit 336(1), and the second remote unit comparator circuit 336(2) in the WDS 300. The signal source 326 provides the modulated signal 328 to the two distinct signal paths leading to each of the first central unit comparator circuit 332, the second central unit comparator circuit 334, the first remote unit comparator circuit 336(1), and the second remote unit comparator circuit 336(2). According to discussions above, the controller 330 is able to obtain a set of propagation delay equations at the first central unit comparator circuit 332, the second central unit comparator circuit 334, the first remote unit comparator circuit 336(1), and the second remote unit comparator circuit 336(2). In the non-limiting examples discussed hereinafter, the controller 330 is configured to utilize the first central unit comparator circuit 332, the second central unit comparator circuit 334, the first remote unit comparator circuit 336(1), and the second remote unit comparator circuit 336(2) to generate five propagation delay equations. Among the five propagation delay equations, a first propagation delay equation (Eq. 1) and a second propagation delay equation (Eq. 2) both include the first downlink propagation delay ($T_{DL1}$), the second downlink propagation delay ($T_{DL2}$), and the RU-to-RU propagation delay ($T_{RU2RU}$) a third propagation delay equation (Eq. 3) includes the first downlink propagation delay ($T_{DL1}$) and the first uplink propagation delay ($T_{UL1}$), a fourth propagation delay equation (Eq. 4) includes the second downlink propagation delay ($T_{DL2}$) and the second uplink propagation delay ($T_{UL2}$), and a fifth propagation delay equation (Eq. 5) includes the second downlink propagation delay ($T_{DL2}$), the RU-to-RU propagation delay ($T_{RU2RU}$), and the first uplink propagation delay ($T_{UL1}$). Hence, by mathematically solving the five propagation delay equations, the controller 330 is able to determine the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$).

With continuing reference to FIG. 3, in a non-limiting example, the central unit 302 includes switches S1-S8. Switches S1 and S2 are configured to couple (closed) or decouple (open) the central unit 302 to the I/O interface 324. When the central unit 302 is coupled to the I/O interface 324, the central unit 302 receives the modulated signal 328 from the signal source 326. Switches S3 and S4 are configured to couple (closed) or decouple (open) a first delay circuit 338 and a second delay circuit 340 to switches S1 and S2, respectively. Switches S5 and S6 are configured to couple (closed) or decouple (open) the first downlink circuit 306(1) and the second downlink circuit 306(2) to switches S1 and S2, respectively. Switches S7 and S8 are configured to couple (closed) or decouple (open) the first central unit comparator circuit 332 and the second central unit comparator circuit 334 to the first delay circuit 338 and the second delay circuit 340, respectively.

The first remote unit 304(1) includes switches S9 and S10. In a non-limiting example, both switches S9 and S10 are three-way switches. Switch S9 is coupled to either the first remote unit comparator circuit 336(1) or a first remote unit downlink circuit 342(1), or remains open. When switch S9 is coupled to the first remote unit comparator circuit 336(1), the first remote unit comparator circuit 336(1) is coupled to the first downlink interface 310(1). When switch S9 is coupled to the first remote unit downlink circuit 342(1), the first remote unit downlink circuit 342(1) is coupled to the first downlink interface 310(1). When switch S9 is open, the first remote unit comparator circuit 336(1) and the first remote unit downlink circuit 342(1) are both decoupled from the first downlink interface 310(1). Switch S10 is coupled to either the first remote unit comparator circuit 336(1) or a first remote unit uplink circuit 344(1), or remains open. When switch S10 is coupled to the first remote unit comparator circuit 336(1), the first remote unit comparator circuit 336(1) is coupled to the first RX antenna 322(1). When switch S10 is coupled to the first remote unit uplink circuit 344(1), the first remote unit uplink circuit 344(1) is coupled to the first RX antenna 322(1). When switch S10 is open, the first remote unit comparator circuit 336(1) and the first remote unit uplink circuit 344(1) are both decoupled from the first RX antenna 322(1).

The second remote unit 304(2) includes switches S11 and S12. In a non-limiting example, both switches S11 and S12 are three-way switches. Switch S11 is coupled to either the second remote unit comparator circuit 336(2) or a second remote unit downlink circuit 342(2), or remains open. When switch S11 is coupled to the second remote unit comparator circuit 336(2), the second remote unit comparator circuit 336(2) is coupled to the second downlink interface 310(2). When switch S11 is coupled to the second remote unit downlink circuit 342(2), the second remote unit downlink circuit 342(2) is coupled to the second downlink interface 310(2). When switch S11 is open, the second remote unit comparator circuit 336(2) and the second remote unit downlink circuit 342(2) are both decoupled from the second downlink interface 310(2). Switch S12 is coupled to either the second remote unit comparator circuit 336(2) or a second remote unit uplink circuit 344(2), or remains open. When switch S12 is coupled to the second remote unit comparator circuit 336(2), the second remote unit comparator circuit 336(2) is coupled to the second RX antenna 322(2). When switch S12 is coupled to the second remote unit uplink circuit 344(2), the second remote unit uplink circuit 344(2) is coupled to the second RX antenna 322(2). When switch S12 is open, the second remote unit comparator circuit 336(2) and the second remote unit uplink circuit 344(2) are both decoupled from the second RX antenna 322(2).

In a non-limiting example, the first downlink communications medium 312(1), the second downlink communications medium 312(2), the first uplink communications medium 316(1), and the second uplink communications medium 316(2) are a first optical fiber-based downlink communications medium 312'(1), a second optical fiber-based downlink communications medium 312'(2), a first optical fiber-based uplink communications medium 316'(1), and a second optical fiber-based uplink communications medium 316'(2), respectively. In this regard, the central unit 302 includes a first electrical-to-optical (E/O) converter 346, a second E/O converter 348, a first optical-to-electrical (O/E) converter 350, and a second O/E converter 352. The first E/O converter 346 is configured to couple the first downlink circuit 306(1) to the first optical fiber-based downlink communications medium 312'(1). The second E/O converter 348 is configured to couple the second downlink circuit 306(2) to the second optical fiber-based downlink communications medium 312'(2). The first O/E converter 350 is configured to couple the first optical fiber-based uplink communications medium 316'(1) to the first uplink circuit 308(1). The second O/E converter 352 is configured to couple the second optical fiber-based uplink communications medium 316'(2) to the second uplink circuit 308(2).

The first remote unit 304(1) includes a first remote unit O/E converter 354(1) and a first remote unit E/O converter 356(1). The first remote unit O/E converter 354(1) is configured to couple the first downlink interface 310(1) to switch S9. The first remote unit E/O converter 356(1) is configured to couple the first remote unit uplink circuit 344(1) to the first uplink interface 314(1). The second remote unit 304(2) includes a second remote unit O/E converter 354(2) and a second remote unit E/O converter 356(2). The second remote unit O/E converter 354(2) is configured to couple the second downlink interface 310(2) to switch S11. The second remote unit E/O converter 356(2) is configured to couple the second remote unit uplink circuit 344(2) to the second uplink interface 314(2).

With continuing reference to FIG. 3, the controller 330 configures each of the first central unit comparator circuit 332, the second central unit comparator circuit 334, the first remote unit comparator circuit 336(1), and the second remote unit comparator circuit 336(2) to generate the five propagation delay equations for determining the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) by configuring the switches S1-S12 in the WDS 300. Details regarding respective configurations for generating the five propagation delay equations are discussed next with references to FIGS. 6-10.

Figure 6:
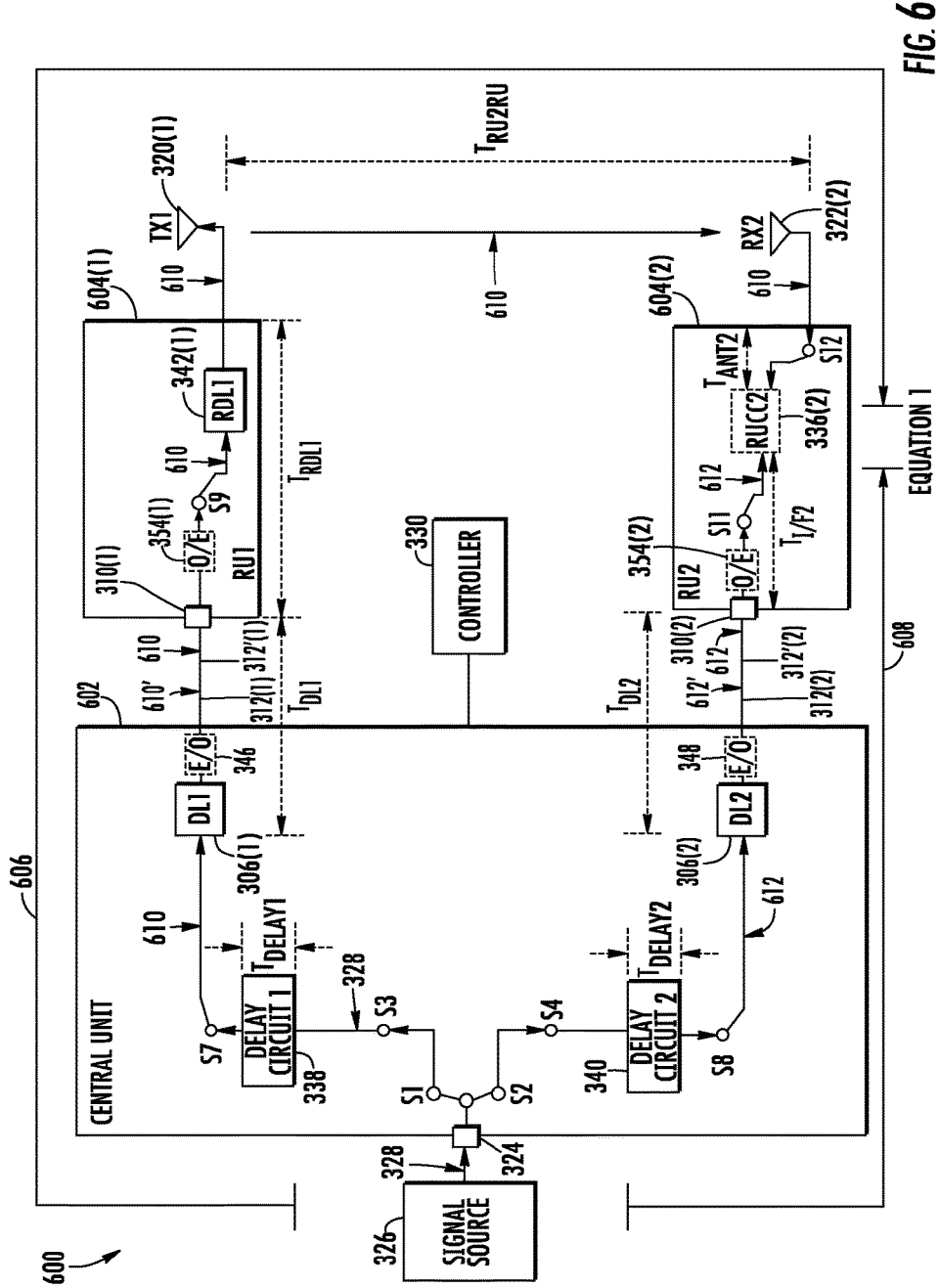
FIG. 6 is a schematic diagram of an exemplary WDS adapted from the WDS of FIG. 3, wherein the WDS is configured to generate a first propagation delay equation that is part of a set of propagation delay equations for determining the downlink and uplink propagation delays in the WDS of FIG. 3 without assuming that downlink propagation delay and uplink propagation delay are symmetric.

FIG. 6 is a schematic diagram of an exemplary WDS 600 adapted from the WDS 300 of FIG. 3 to generate the first propagation delay equation (Eq. 1) for determining the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) in the WDS 300. Common elements between FIGS. 3 and 6 are shown therein with common element numbers and will not be re-described herein. With reference to FIG. 6, the WDS 600 includes a central unit 602, at least one first remote unit 604(1), and at least one second remote unit 604(2). Switches S1 and S2 are closed to couple the central unit 602 to the I/O interface 324 to receive the modulated signal 328 from the signal source 326. Switches S3 and S4 are closed to couple the first delay circuit 338 and the second delay circuit 340 to switches S1 and S2, respectively. Since switch S1 and S2 are both closed, the first delay circuit 338 and the second delay circuit 340 are therefore coupled to the I/O interface 324 to receive the modulated signal 328. Switches S7 and S8 are configured to couple the first downlink circuit 306(1) and the second downlink circuit 306(2) to the first delay circuit 338 and the second delay circuit 340, respectively.

In the first remote unit 604(1), switch S9 is configured to couple the first remote unit downlink circuit 342(1) to the first downlink interface 310(1). The first remote unit downlink circuit 342(1) is also communicatively coupled to the first TX antenna 320(1). In the second remote unit 604(2), switch S11 is configured to couple the second remote unit comparator circuit 336(2) to the second downlink interface 310(2). Switch S12 is configured to communicatively couple the second remote unit comparator circuit 336(2) to the second RX antenna 322(2).

With continuing reference to FIG. 6, in the WDS 600, the modulated signal 328 is configured to propagate from the I/O interface 324 to the second remote unit comparator circuit 336(2) via a first signal path 606 and a second signal path 608. On the first signal path 606, the first delay circuit 338 receives the modulated signal 328 from the I/O interface 324. The controller 330 controls the first delay circuit 338 to delay the received modulated signal 328 by a respective first delay ($T_{DELAY1}$) to generate a first delayed modulated signal 610. The first downlink circuit 306(1) receives the first delayed modulated signal 610 from the first delay circuit 338 and provides the first delayed modulated signal 610 to the first downlink interface 310(1) over the first downlink communications medium 312(1). The first remote unit downlink circuit 342(1) receives the first delayed modulated signal 610 from the first downlink interface 310(1) and provides the first delayed modulated signal 610 to the first TX antenna 320(1). The second RX antenna 322(2) in the second remote unit 604(2) receives the first delayed modulated signal 610 from the first TX antenna 320(1) and provides the first delayed modulated signal 610 to the second remote unit comparator circuit 336(2). In this regard, the modulated signal 328 propagating along the first signal path 606 experiences a first propagation delay ($T_{TOTAL1}$) that includes the first delay ($T_{DELAY1}$), the first downlink propagation delay ($T_{DL1}$), a first remote unit downlink propagation delay ($T_{RDL1}$) associated with the first remote unit downlink circuit 342(1), the RU-to-RU propagation delay ($T_{RU2RU}$) from the first TX antenna 320(1) to the second RX antenna 322(2), and a second antenna delay ($T_{ANT2}$) between the second RX antenna 322(2) and the second remote unit comparator circuit 366(2) ($T_{TOTAL1}=T_{DELAY1}+T_{DL1}+T_{RDL1}+T_{RU2RU}+T_{ANT2}$).

In the second signal path 608, the second delay circuit 340 receives the modulated signal 328. The controller 330 controls the second delay circuit 340 to delay the received modulated signal 328 from the I/O interface 324 by a respective second delay ($T_{DELAY2}$) to generate a second delayed modulated signal 612. The second downlink circuit 306(2) receives the second delayed modulated signal 612 from the second delay circuit 340 and provides the second delayed modulated signal 612 to the second downlink interface 310(2) over the second downlink communications medium 312(2). The second remote unit comparator circuit 336(2) receives the second delayed modulated signal 612 from the second downlink interface 310(2). In this regard, the modulated signal 328 propagating along the second signal path 608 experiences a second propagation delay ($T_{TOTAL2}$) that includes the second delay ($T_{DELAY2}$), the second downlink propagation delay ($T_{DL2}$), and a second interface delay ($T_{I/F2}$) between the second downlink interface 310(2) and the second remote unit comparator circuit 366(2) ($T_{TOTAL2}=T_{DELAY2}+T_{DL2}+T_{I/F2}$).

With continuing reference to FIG. 6, the controller 330 controls the first delay circuit 338 and/or the second delay circuit 340 to adjust the first delay ($T_{DELAY1}$) and/or the second delay ($T_{DELAY2}$) until the first propagation delay ($T_{TOTAL1}$) equals the second propagation delay ($T_{TOTAL2}$). In a non-limiting example, if the first propagation delay ($T_{TOTAL1}$) is greater than the second propagation delay ($T_{TOTAL2}$), the controller 330 decreases the first delay ($T_{DELAY1}$) and/or increases the second delay ($T_{DELAY2}$) until the first propagation delay ($T_{TOTAL1}$) and the second propagation delay ($T_{TOTAL2}$) are equal. In contrast, if the first propagation delay ($T_{TOTAL1}$) is less than the second propagation delay ($T_{TOTAL2}$), the controller 330 increases the first delay ($T_{DELAY1}$) and/or decreases the second delay ($T_{DELAY2}$) until the first propagation delay ($T_{TOTAL1}$) and the second propagation delay ($T_{TOTAL2}$) are equal. When the first propagation delay ($T_{TOTAL1}$) and the second propagation delay ($T_{TOTAL2}$) are equal to each other, the controller 330 can thus generate the first propagation delay equation (Eq. 1) as below.

$$T_{DELAY1}+T_{DL1}+T_{RDL1}+T_{RU2RU}+T_{ANT2}=T_{DELAY2}+T_{DL2}+T_{I/F2} \quad \text{(Eq. 1)}$$

Among the parameters in the first propagation equation, the first downlink propagation delay ($T_{DL1}$), the RU-to-RU propagation delay ($T_{RU2RU}$), and the second downlink propagation delay ($T_{DL2}$) are unknown. The first delay ($T_{DELAY1}$) and the second delay ($T_{DELAY2}$) are known based on the settings of the first delay circuit 338 and the second delay circuit 340. The first remote unit downlink propagation delay ($T_{RDL1}$), the second antenna delay ($T_{ANT2}$), and the second interface delay ($T_{I/F2}$) can be measured at the first remote unit 604(1) and the second remote unit 604(2) during a testing or a commissioning stage.

With continuing reference to FIG. 6, in a non-limiting example, the central unit 602 includes the first E/O converter 346 and the second E/O converter 348. The first E/O converter 346 is configured to receive the first delayed modulated signal 610 from the first downlink circuit 306(1) to generate a first optical delayed modulated signal 610'. The first E/O converter 346 provides the first optical delayed modulated signal 610' to the first downlink interface 310(1) over the first optical fiber-based downlink communications medium 312'(1). The second E/O converter 348 is configured to receive the second delayed modulated signal 612 from the second downlink circuit 306(2) to generate a second optical delayed modulated signal 612'. The second E/O converter 348 provides the second optical delayed modulated signal 612' to the second downlink interface 310(2) over the second optical fiber-based downlink communications medium 312'(2).

The first remote unit 604(1) includes the first remote unit O/E converter 354(1) configured to receive the first optical delayed modulated signal 610' from the first downlink interface 310(1). The first remote unit O/E converter 354(1) converts the first optical delayed modulated signal 610' into the first delayed modulated signal 610 and provides the first delayed modulated signal 610 to the first remote unit downlink circuit 342(1) via switch S9. The second remote unit 604(2) includes the second remote unit O/E converter 354(2)

configured to receive the second optical delayed modulated signal 612' from the second downlink interface 310(2). The second remote unit O/E converter 354(2) converts the second optical delayed modulated signal 612' into the second delayed modulated signal 612 and provides the second delayed modulated signal 612 to the second remote unit comparator circuit 336(2) via switch S11.

Figure 7:
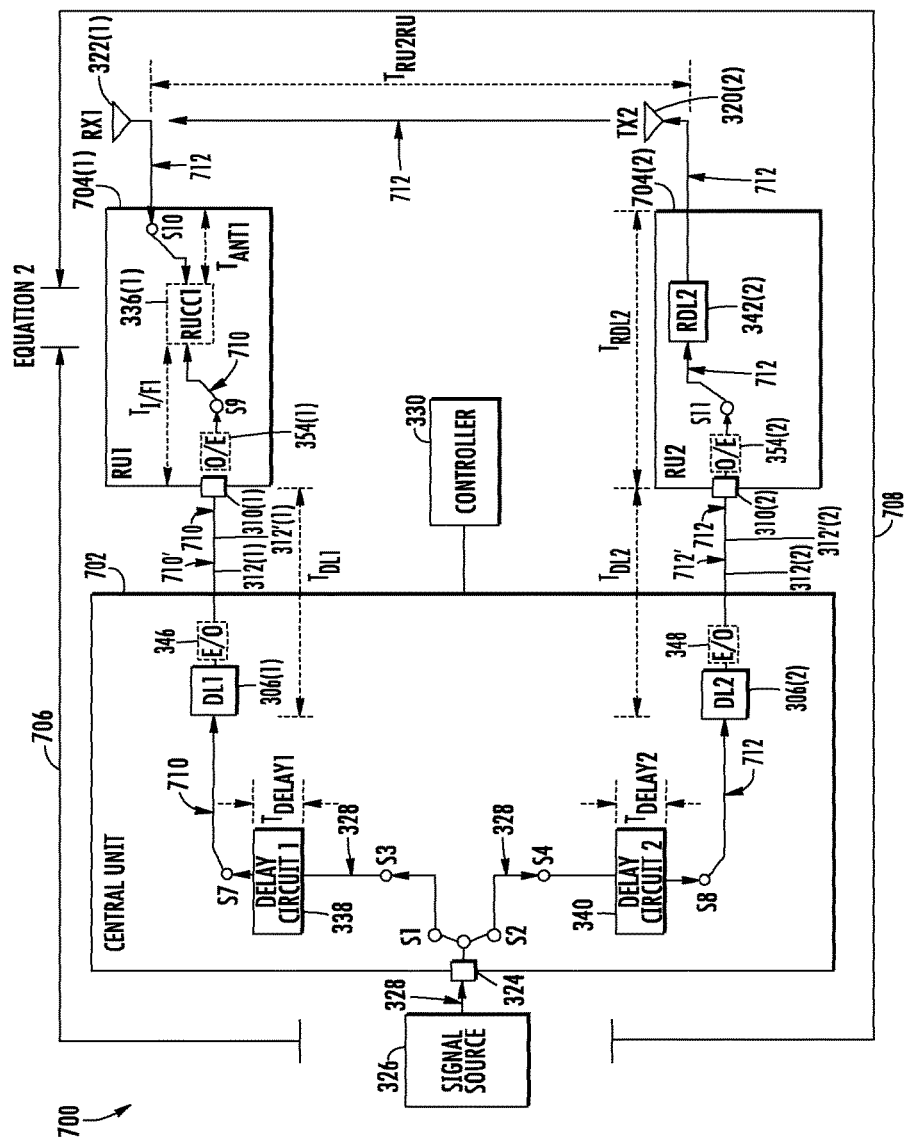
FIG. 7 is a schematic diagram of an exemplary WDS adapted from the WDS of FIG. 3, wherein the WDS is configured to generate a second propagation delay equation that is part of the set of propagation delay equations of FIG. 6 for determining the downlink and uplink propagation delays in the WDS of FIG. 3 without assuming that downlink propagation delay and uplink propagation delay are symmetric.

FIG. 7 is a schematic diagram of an exemplary WDS 700 adapted from the WDS 300 of FIG. 3 to generate the second propagation delay equation (Eq. 2) for determining the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) in the WDS 300. Common elements between FIGS. 3 and 7 are shown therein with common element numbers and will not be re-described herein. With reference to FIG. 7, the WDS 700 includes a central unit 702, at least one first remote unit 704(1), and at least one second remote unit 704(2). Switches S1 and S2 are closed to couple the central unit 702 to the I/O interface 324 to receive the modulated signal 328 from the signal source 326. Switches S3 and S4 are closed to couple the first delay circuit 338 and the second delay circuit 340 to switches S1 and S2, respectively. Since switches S1 and S2 are both closed, the first delay circuit 338 and the second delay circuit 340 are therefore coupled to the I/O interface 324 to receive the modulated signal 328. Switches S7 and S8 are configured to couple the first downlink circuit 306(1) and the second downlink circuit 306(2) to the first delay circuit 338 and the second delay circuit 340, respectively.

In the first remote unit 704(1), switch S9 is configured to couple the first remote unit comparator circuit 336(1) to the first downlink interface 310(1). Switch S10 is configured to communicatively couple the first remote unit comparator circuit 336(1) to the first RX antenna 322(1). In the second remote unit 704(2), switch S11 is configured to couple the second remote unit downlink circuit 342(2) to the second downlink interface 310(2). The second remote unit downlink circuit 342(2) is also communicatively coupled to the second TX antenna 320(2).

With continuing reference to FIG. 7, in the WDS 700, the modulated signal 328 is configured to propagate from the I/O interface 324 to the first remote unit comparator circuit 336(1) via a third signal path 706 and a fourth signal path 708. In the third signal path 706, the first delay circuit 338 receives the modulated signal 328 from the I/O interface 324. The controller 330 controls the first delay circuit 338 to delay the received modulated signal 328 by a respective first delay ($T_{DELAY1}$) to generate a first delayed modulated signal 710. The first downlink circuit 306(1) receives the first delayed modulated signal 710 from the first delay circuit 338 and provides the first delayed modulated signal 710 to the first downlink interface 310(1) over the first downlink communications medium 312(1). The first remote unit comparator circuit 336(1) receives the first delayed modulated signal 710 from the first downlink interface 310(1). In this regard, the modulated signal 328 propagating along the third signal path 706 experiences a third propagation delay ($T_{TOTAL3}$) that includes the first delay ($T_{DELAY1}$), the first downlink propagation delay ($T_{DL1}$), and a first interface delay ($T_{I/F1}$) between the first downlink interface 310(1) and the first remote unit comparator circuit 366(1) ($T_{TOTAL3}=T_{DELAY1}+T_{DL1}+T_{I/F1}$).

In the fourth signal path 708, the second delay circuit 340 receives the modulated signal 328 from the I/O interface 324. The controller 330 controls the second delay circuit 340 to delay the received modulated signal 328 by a respective second delay ($T_{DELAY2}$) to generate a second delayed modulated signal 712. The second downlink circuit 306(2) receives the second delayed modulated signal 712 from the second delay circuit 340 and provides the second delayed modulated signal 712 to the second downlink interface 310(2) over the second downlink communications medium 312(2). The second remote unit downlink circuit 342(2) receives the second delayed modulated signal 712 from the second downlink interface 310(2) and provides the second delayed modulated signal 712 to the second TX antenna 320(2). The first RX antenna 322(1) in the first remote unit 704(1) receives the second delayed modulated signal 712 from the second TX antenna 320(2) and provides the second delayed modulated signal 712 to the first remote unit comparator circuit 336(1). In this regard, the modulated signal 328 propagating along the fourth signal path 708 experiences a fourth propagation delay ($T_{TOTAL4}$) that includes the second delay ($T_{DELAY2}$), the second downlink propagation delay ($T_{DL2}$), a second remote unit downlink propagation delay ($T_{RDL2}$) associated with the second remote unit downlink circuit 342(2), the RU-to-RU propagation delay ($T_{RU2RU}$) between the second TX antenna 320(2) and the first RX antenna 322(1), and a first antenna delay ($T_{ANT1}$) between the first RX antenna 322(1) and the first remote unit comparator circuit 366(1) ($T_{TOTAL4}=T_{DELAY2}+T_{DL2}+T_{RDL2}+T_{RU2RU}+T_{ANT1}$).

With continuing reference to FIG. 7, the controller 330 controls the first delay circuit 338 and/or the second delay circuit 340 to adjust the first delay ($T_{DELAY1}$) and/or the second delay ($T_{DELAY2}$) until the third propagation delay ($T_{TOTAL3}$) equals the fourth propagation delay ($T_{TOTAL4}$). In a non-limiting example, if the third propagation delay ($T_{TOTAL3}$) is greater than the fourth propagation delay ($T_{TOTAL4}$), the controller 330 may decrease the $T_{DELAY3}$ and/or increase the $T_{DELAY4}$ until the third propagation delay ($T_{TOTAL3}$) and the fourth propagation delay ($T_{TOTAL4}$) are equal. In contrast, if the third propagation delay ($T_{TOTAL3}$) is less than the fourth propagation delay ($T_{TOTAL4}$), the controller 330 may increase the $T_{DELAY3}$ and/or decrease the $T_{DELAY4}$ until the third propagation delay ($T_{TOTAL3}$) and the fourth propagation delay ($T_{TOTAL4}$) are equal. When the third propagation delay ($T_{TOTAL3}$) and the fourth propagation delay ($T_{TOTAL4}$) are equal to each other, the controller 330 can thus generate the second propagation delay equation (Eq. 2) as below.

$$T_{DELAY1}+T_{DL1}+T_{I/F1}=T_{DELAY2}+T_{DL2}+T_{RDL2}+T_{RU2RU}+T_{ANT1} \quad \text{(Eq. 2)}$$

Among the parameters in the second propagation equation, the first downlink propagation delay ($T_{DL1}$), the RU-to-RU propagation delay ($T_{RU2RU}$), and the second downlink propagation delay ($T_{DL2}$) are unknown. The first delay ($T_{DELAY1}$) and the second delay ($T_{DELAY2}$) are known based on the settings of the first delay circuit 338 and the second delay circuit 340, respectively. The first interface delay ($T_{I/F1}$), the second remote unit downlink propagation delay ($T_{RDL2}$), and the first antenna delay ($T_{ANT1}$) can be measured at the first remote unit 704(1) and the second remote unit 704(2) during a factory final testing.

With continuing reference to FIG. 7, in a non-limiting example, the central unit 702 includes the first E/O converter 346 and the second E/O converter 348. The first E/O converter 346 is configured to receive the first delayed modulated signal 710 from the first downlink circuit 306(1) to generate a first optical delayed modulated signal 710'. The first E/O converter 346 provides the first optical delayed modulated signal 710' to the first downlink interface 310(1)

over the first optical fiber-based downlink communications medium 312'(1). The second E/O converter 348 is configured to receive the second delayed modulated signal 712 from the second downlink circuit 306(2) to generate a second optical delayed modulated signal 712'. The second E/O converter 348 provides the second optical delayed modulated signal 712' to the second downlink interface 310(2) over the second optical fiber-based downlink communications medium 312'(2).

The first remote unit 704(1) includes the first remote unit O/E converter 354(1) configured to receive the first optical delayed modulated signal 710' from the first downlink interface 310(1). The first remote unit O/E converter 354(1) converts the first optical delayed modulated signal 710' into the first delayed modulated signal 710 and provides the first delayed modulated signal 710 to the first remote unit comparator circuit 336(1) via switch S9. The second remote unit 704(2) includes the second remote unit O/E converter 354(2) configured to receive the second optical delayed modulated signal 712' from the second downlink interface 310(2). The second remote unit O/E converter 354(2) converts the second optical delayed modulated signal 712' into the second delayed modulated signal 712 and provides the second delayed modulated signal 712 to the second remote unit downlink circuit 342(2) via switch S11.

Figure 8:
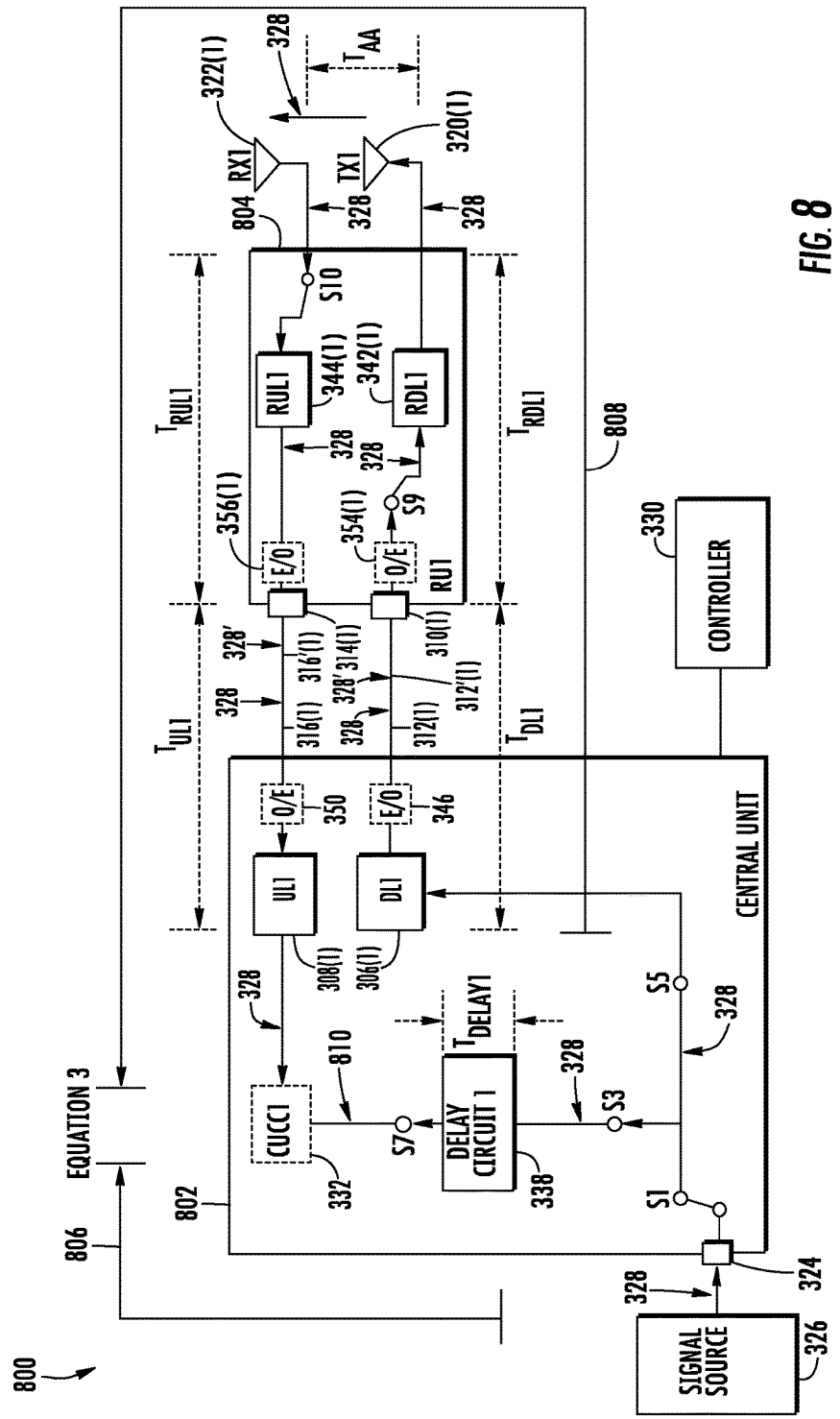
FIG. 8 is a schematic diagram of an exemplary WDS adapted from the WDS of FIG. 3, wherein the WDS is configured to generate a third propagation delay equation that is part of the set of propagation delay equations of FIGS. 6 and 7 for determining the downlink and uplink propagation delays in the WDS of FIG. 3 without assuming that downlink propagation delay and uplink propagation delay are symmetric.

FIG. 8 is a schematic diagram of an exemplary WDS 800 adapted from the WDS 300 of FIG. 3 to generate the third propagation delay equation (Eq. 3) for determining the first downlink propagation delay ($T_{UL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) in the WDS 300. Common elements between FIGS. 3 and 8 are shown therein with common element numbers and will not be re-described herein. With reference to FIG. 8, the WDS 800 includes a central unit 802 and at least one first remote unit 804. Switch S1 is closed to couple the central unit 802 to the I/O interface 324 to receive the modulated signal 328 from the signal source 326. Switch S3 is closed to couple the first delay circuit 338 to switch S1. Since switch S1 is also closed, the first delay circuit 338 is therefore coupled to the I/O interface 324 to receive the modulated signal 328. Switch S5 is closed to couple the first downlink circuit 306(1) to switch S1 to receive the modulated signal 328. Switch S7 is closed to couple the first central unit comparator circuit 332 to the first delay circuit 338. In the first remote unit 804, switch S9 is closed to couple the first remote unit downlink circuit 342(1) to the first downlink interface 310(1). Switch S10 is closed to couple the first remote unit uplink circuit 344(1) to the first RX antenna 322(1).

With continuing reference to FIG. 8, in the WDS 800, the modulated signal 328 is configured to propagate from the I/O interface 324 to the first central unit comparator circuit 332 via a fifth signal path 806 and a sixth signal path 808. In the fifth signal path 806, the first delay circuit 338 receives the modulated signal 328. The controller 330 controls the first delay circuit 338 to delay the received modulated signal 328 by a respective first delay ($T_{DELAY1}$) to generate a first delayed modulated signal 810, and the first delay circuit 338 provides the first delayed modulated signal 810 to the first central unit comparator circuit 332. In this regard, the modulated signal 328 propagating along the fifth signal path 806 experiences a fifth propagation delay ($T_{TOTAL5}$) that includes the first delay ($T_{DELAY1}$) ($T_{TOTAL5}=T_{DELAY1}$).

In the sixth signal path 808, the first downlink circuit 306(1) receives the modulated signal 328 from I/O interface 324 and provides the modulated signal 328 to the first downlink interface 310(1) over the first downlink communications medium 312(1). The first remote unit downlink circuit 342(1) receives the modulated signal 328 from the first downlink interface 310(1) and provides the modulated signal 328 to the first TX antenna 320(1). The first RX antenna 322(1) receives the modulated signal 328 from the first TX antenna 320(1) and provides the modulated signal 328 to the first remote unit uplink circuit 344(1). The first remote unit uplink circuit 344(1) provides the modulated signal 328 to the first uplink interface 314(1). The first uplink circuit 308(1) receives the modulated signal 328 over the first uplink communications medium 316(1) and provides the modulated signal 328 to the first central unit comparator circuit 332. In this regard, the modulated signal 328 propagating along the sixth signal path 808 experiences a sixth propagation delay ($T_{TOTAL6}$) that includes the first downlink propagation delay ($T_{DL1}$), the first remote unit downlink propagation delay ($T_{RDL1}$) associated with the first remote unit downlink circuit 342(1), an antenna-to-antenna propagation delay ($T_{AA}$) from the first TX antenna 320(1) to the first RX antenna 322(1), a first remote unit uplink propagation delay ($T_{RUL1}$) associated with the first remote unit uplink circuit 344(1), and the first uplink propagation delay ($T_{UL1}$) ($T_{TOTAL6}=T_{DL1}+T_{RDL1}+T_{AA}+T_{RUL1}+T_{UL1}$).

With continuing reference to FIG. 8, the controller 330 controls the first delay circuit 338 to adjust the first delay ($T_{DELAY1}$) until the fifth propagation delay ($T_{TOTAL5}$) equals the sixth propagation delay ($T_{TOTAL6}$). When the fifth propagation delay ($T_{TOTAL5}$) and the sixth propagation delay ($T_{TOTAL6}$) are equal to each other, the controller 330 can thus generate the third propagation delay equation (Eq. 3) as below.

$$T_{DELAY1}=T_{DL1}+T_{RDL1}+T_{AA}+T_{RUL1}+T_{UL1} \qquad (Eq. 3)$$

Among the parameters in the second propagation equation, the first downlink propagation delay ($T_{DL1}$) and the first uplink propagation delay ($T_{UL1}$) are unknown. The first delay ($T_{DELAY1}$) is known based on the settings of the first delay circuit 338. The first remote unit downlink propagation delay ($T_{RDL1}$), the antenna-to-antenna propagation delay ($T_{AA}$), and the first remote unit uplink propagation delay ($T_{RUL1}$) can be measured at the first remote unit 804 during a factory final testing.

With continuing reference to FIG. 8, in a non-limiting example, the central unit 802 includes the first E/O converter 346 and the first O/E converter 350. The first E/O converter 346 is configured to receive the modulated signal 328 from the first downlink circuit 306(1) to generate an optical modulated signal 328'. The first E/O converter 346 provides the optical modulated signal 328' to the first downlink interface 310(1) over the first optical fiber-based downlink communications medium 312'(1). The first remote unit 804 includes the first remote unit O/E converter 354(1) configured to receive the optical modulated signal 328' from the first downlink interface 310(1). The first remote unit O/E converter 354(1) converts the optical modulated signal 328' into the modulated signal 328 and provides the modulated signal 328 to the first remote unit downlink circuit 342(1) via switch S9. The first remote unit 804 also includes the first remote unit E/O converter 356(1) configured to receive the modulated signal 328 from the first remote unit uplink circuit 344(1). The first remote unit E/O converter 356(1) converts the modulated signal 328 into the optical modulated signal 328' and provides the optical modulated signal 328' to the first uplink interface 314(1). The first O/E converter 350 in the central unit 802 is configured to receive the optical modulated signal 328' over the first optical fiber-based uplink communications medium 316'(1) and converts the optical modulated signal 328' into the modulated signal 328. The first O/E converter 350 provides the modulated signal 328 to the first uplink circuit 308(1).

Figure 9:
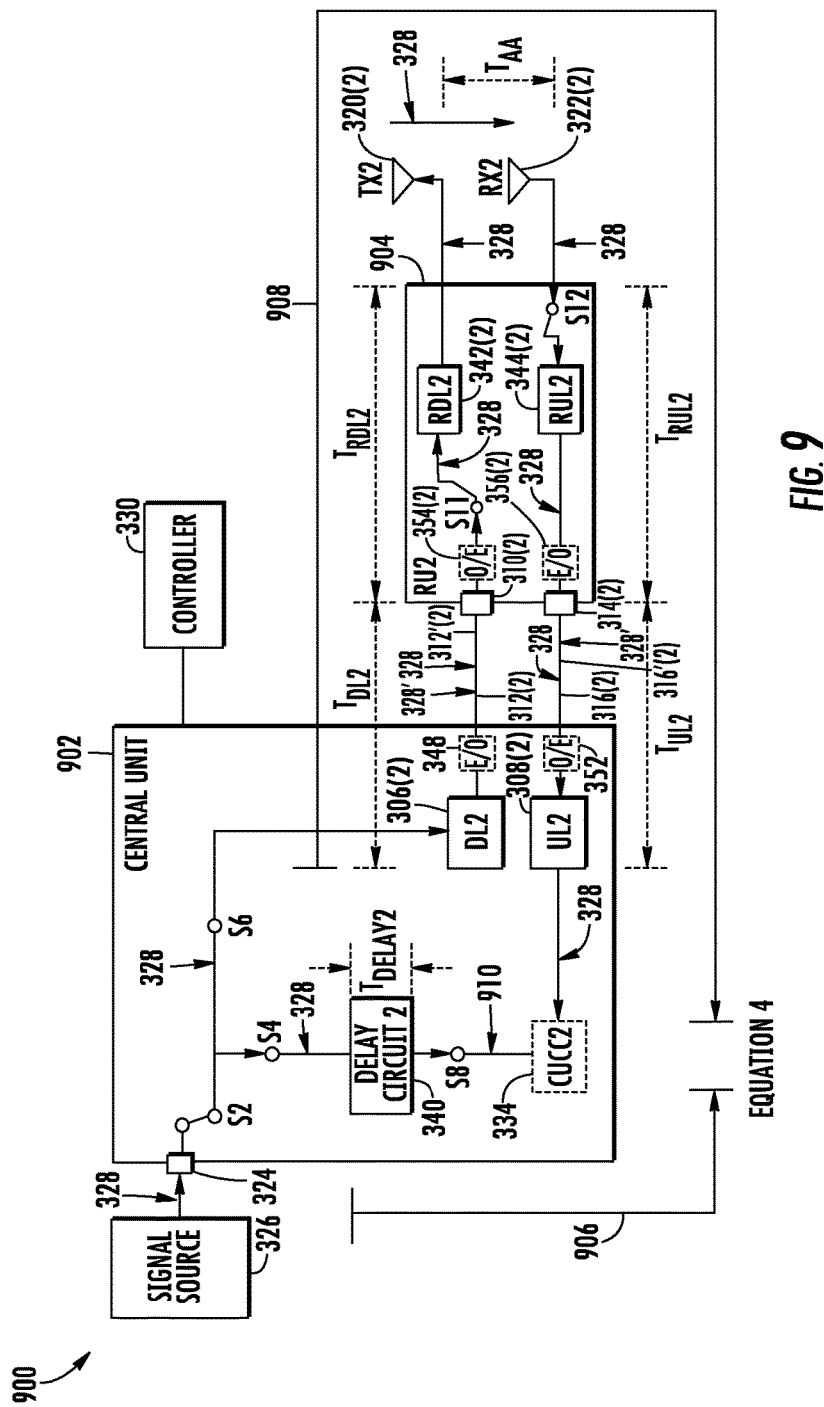
FIG. 9 is a schematic diagram of an exemplary WDS adapted from the WDS of FIG. 3, wherein the WDS is configured to generate a fourth propagation delay equation that is part of the set of propagation delay equations of FIGS. 6-8 for determining the downlink and uplink propagation delays in the WDS of FIG. 3 without assuming that downlink propagation delay and uplink propagation delay are symmetric.

FIG. 9 is a schematic diagram of an exemplary WDS 900 adapted from the WDS 300 of FIG. 3 to generate the fourth propagation delay equation (Eq. 4) for determining the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) in the WDS 300. Common elements between FIGS. 3 and 9 are shown therein with common element numbers and will not be re-described herein. With reference to FIG. 9, the WDS 900 includes a central unit 902 and at least one second remote unit 904. Switch S2 is closed to couple the central unit 902 to the I/O interface 324 to receive the modulated signal 328 from the signal source 326. Switch S4 is closed to couple the second delay circuit 340 to switch S2. Since switch S2 is closed, the second delay circuit 340 is therefore coupled to the I/O interface 324 to receive the modulated signal 328. Switch S6 is closed to couple the second downlink circuit 306(2) to switch S2 to receive the modulated signal 328. Switch S8 is closed to couple the second central unit comparator circuit 334 to the second delay circuit 340. In the second remote unit 904, switch S11 is closed to couple the second remote unit downlink circuit 342(2) to the second downlink interface 310(2). Switch S12 is closed to couple the second remote unit uplink circuit 344(2) to the second RX antenna 322(2).

With continuing reference to FIG. 9, in the WDS 900, the modulated signal 328 is configured to propagate from the I/O interface 324 to the second central unit comparator circuit 334 via a seventh signal path 906 and an eighth signal path 908. In the seventh signal path 906, the second delay circuit 340 receives the modulated signal 328. The controller 330 controls the second delay circuit 340 to delay the received modulated signal 328 by a respective second delay ($T_{DELAY2}$) to generate a second delayed modulated signal 910, and the second delay circuit 340 provides the second delayed modulated signal 910 to the second central unit comparator circuit 334. In this regard, the modulated signal 328 propagating along the seventh signal path 906 experiences a seventh propagation delay ($T_{TOTAL7}$) that includes the second delay ($T_{DELAY2}$) ($T_{TOTAL7}=T_{DELAY2}$).

In the eighth signal path 908, the second downlink circuit 306(2) receives the modulated signal 328 from the I/O interface 324 and provides the modulated signal 328 to the second downlink interface 310(2) over the second downlink communications medium 312(2). The second remote unit downlink circuit 342(2) receives the modulated signal 328 from the second downlink interface 310(2) and provides the modulated signal 328 to the second TX antenna 320(2). The second RX antenna 322(2) receives the modulated signal 328 from the second TX antenna 320(2) and provides the modulated signal 328 to the second remote unit uplink circuit 344(2). The second remote unit uplink circuit 344(2) provides the modulated signal 328 to the second uplink interface 314(2). The second uplink circuit 308(2) receives the modulated signal 328 from the second uplink interface 314(2) over the second uplink communications medium 316(2) and provides the modulated signal 328 to the second central unit comparator circuit 334. In this regard, the modulated signal 328 propagating along the eighth signal path 908 experiences an eighth propagation delay ($T_{TOTAL8}$) that includes the second downlink propagation delay ($T_{DL2}$), the second remote unit downlink propagation delay ($T_{RDL2}$) associated with the second remote unit downlink circuit 342(2), the antenna-to-antenna propagation delay ($T_{AA}$) from the second TX antenna 320(2) to the second RX antenna 322(2), a second remote unit uplink propagation delay ($T_{RUL2}$) associated with the second remote unit uplink circuit 344(2), and the second uplink propagation delay ($T_{UL2}$) ($T_{TOTAL8}=T_{DL2}+T_{RDL2}+T_{AA}+T_{RUL2}+T_{UL2}$).

With continuing reference to FIG. 9, the controller 330 controls the second delay circuit 340 to adjust the second delay ($T_{DELAY2}$) until the seventh propagation delay ($T_{TOTAL7}$) equals the eighth propagation delay ($T_{TOTAL8}$). When the seventh propagation delay ($T_{TOTAL7}$) and the eighth propagation delay ($T_{TOTAL8}$) are equal to each other, the controller 330 can thus generate the fourth propagation delay equation (Eq. 4) as below.

$$T_{DELAY2}=T_{DL2}+T_{RDL2}+T_{AA}+T_{RUL2}+T_{UL2} \qquad \text{(Eq. 4)}$$

Among the parameters in the second propagation equation, the second downlink propagation delay ($T_{DL2}$) and the second uplink propagation delay ($T_{DL2}$) are unknown. The second delay ($T_{DELAY2}$) is known based on the settings of the second delay circuit 340. The second remote unit downlink propagation delay ($T_{RDL2}$), the antenna-to-antenna propagation delay ($T_{AA}$), and the second remote unit uplink propagation delay ($T_{RUL2}$) can be measured at the second remote unit 904 during a factory final testing.

With continuing reference to FIG. 9, in a non-limiting example, the central unit 902 includes the second E/O converter 348 and the second O/E converter 352. The second E/O converter 348 is configured to receive the modulated signal 328 from the second downlink circuit 306(2) to generate the optical modulated signal 328'. The first E/O converter 346 provides the optical modulated signal 328' to the second downlink interface 310(2) over the second optical fiber-based downlink communications medium 312'(2). The second remote unit 904 includes the second remote unit O/E converter 354(2) configured to receive the optical modulated signal 328' from the second downlink interface 310(2). The second remote unit O/E converter 354(2) converts the optical modulated signal 328' into the modulated signal 328 and provides the modulated signal 328 to the second remote unit downlink circuit 342(2) via switch S11. The second remote unit 904 includes the second remote unit E/O converter 356(2) configured to receive the modulated signal 328 from the second remote unit uplink circuit 344(2). The second remote unit E/O converter 356(2) converts the modulated signal 328 into the optical modulated signal 328' and provides the optical modulated signal 328' to the second uplink interface 314(2). The second O/E converter 352 in the central unit 902 is configured to receive the optical modulated signal 328' from the second uplink interface 314(2) over the second optical fiber-based uplink communications medium 316'(2) and converts the optical modulated signal 328' into the modulated signal 328. The second O/E converter 352 provides the modulated signal 328 to the second uplink circuit 308(2).

Figure 10:
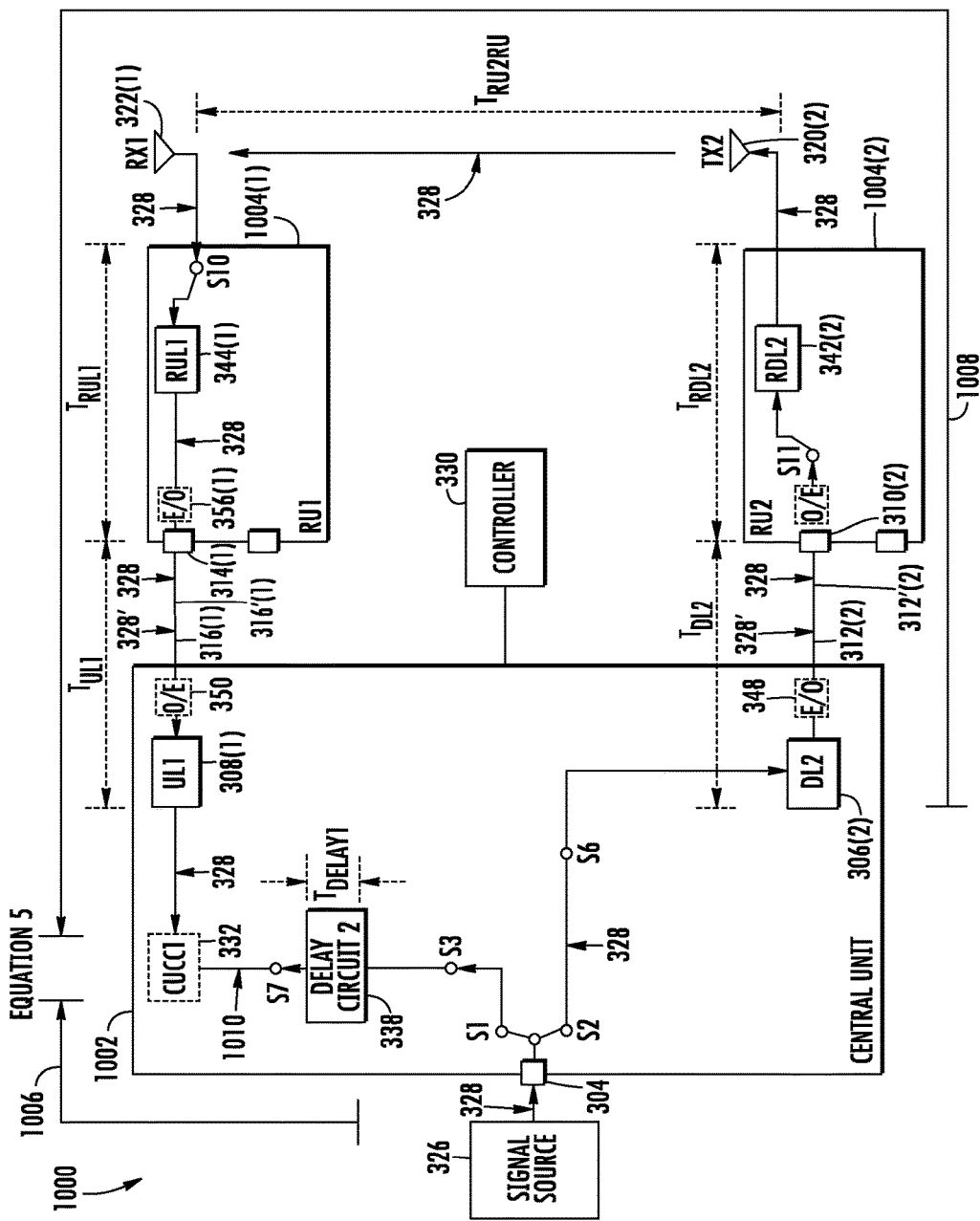
FIG. 10 is a schematic diagram of an exemplary WDS adapted from the WDS of FIG. 3, wherein the WDS is configured to generate a fifth propagation delay equation that is part of the set of propagation delay equations of FIGS. 6-9 for determining the downlink and uplink propagation delays in the WDS of FIG. 3 without assuming that downlink propagation delay and uplink propagation delay are symmetric.

FIG. 10 is a schematic diagram of an exemplary WDS 1000 adapted from the WDS 300 of FIG. 3 to generate the fifth propagation delay equation (Eq. 5) for determining the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) in the WDS 300. Common elements between FIGS. 3 and 10 are shown therein with common element numbers and will not be re-described herein. With reference to FIG. 10, the WDS 1000 includes a central unit 1002, at least one first remote unit 1004(1), and at least one second remote unit 1004(2). Switches S1 and S2 are closed to couple the central unit 1002 to the I/O interface 324 to receive the modulated signal 328 from the signal source 326. Switch S3 is closed to couple the first delay circuit 338 to switch S1. Since switch S1 is closed, the first delay circuit 338 is therefore coupled to the I/O interface 324 to receive the modulated signal 328. Switch S7 is closed to couple the first delay circuit 338 to the first central unit comparator circuit 332. In the first remote unit 1004(1), switch S10 is closed to couple the first remote unit uplink circuit 344(1) to the first RX antenna 322(1). In the second remote unit 1004(2), switch S11 is closed to couple the second remote unit downlink circuit 342(2) to the second downlink interface 310(2).

With continuing reference to FIG. 10, in the WDS 1000, the modulated signal 328 is configured to propagate from the I/O interface 324 to the first central unit comparator circuit 332 via a ninth signal path 1006 and a tenth signal path 1008. On the ninth signal path 1006, the first delay circuit 338 receives the modulated signal 328. The controller 330 controls the first delay circuit 338 to delay the received modulated signal 328 by a respective first delay ($T_{DELAY1}$) to generate a first delayed modulated signal 1010. In this regard, the modulated signal 328 propagating along the ninth signal path 1006 experiences a ninth propagation delay ($T_{TOTAL9}$) that includes the first delay ($T_{DELAY1}$) ($T_{TOTAL9}=T_{DELAY1}$).

In the tenth signal path 1008, the second downlink circuit 306(2) receives the modulated signal 328 and provides the modulated signal 328 to the second downlink interface 310(2) over the second downlink communications medium 312(2). The second remote unit downlink circuit 342(2) in the second remote unit 1004(2) receives the modulated signal 328 from the second downlink interface 310(2) and provides the modulated signal 328 to the second TX antenna 320(2). The second TX antenna 320(2) transmits the modulated signal 328 to the first RX antenna 322(1) in the first remote unit 1004(1). The first remote unit uplink circuit 344(1) receives the modulated signal 328 from the first RX antenna 322(1) and provides the modulated signal 328 to the first uplink interface 314(1). The first uplink circuit 308(1) in the central unit 1002 receives the modulated signal 328 from the first uplink interface 314(1) over the first uplink communications medium 316(1) and provides the modulated signal 328 to the first central unit comparator circuit 332. In this regard, the modulated signal 328 propagating along the tenth signal path 1008 experiences a tenth propagation delay ($T_{TOTAL10}$) that includes the second downlink propagation delay ($T_{DL2}$), the second remote unit downlink propagation delay ($T_{RDL2}$), the RU-to-RU propagation delay ($T_{RU2RU}$), the first remote unit uplink propagation delay ($T_{RUL1}$), and the first uplink propagation delay ($T_{UL1}$) ($T_{TOTAL10}=T_{DL2}+T_{RDL2}+T_{RU2RU}+T_{RUL1}+T_{UL1}$).

With continuing reference to FIG. 10, the controller 330 controls the first delay circuit 338 to adjust the first delay ($T_{DELAY1}$) until the ninth propagation delay ($T_{TOTAL9}$) equals the tenth propagation delay ($T_{TOTAL10}$). When the ninth propagation delay ($T_{TOTAL9}$) and the tenth propagation delay ($T_{TOTAL10}$) are equal to each other, the controller 330 can thus generate the fifth propagation delay equation (Eq. 5) as below.

$$T_{DELAY1}=T_{DL2}+T_{RDL2}+T_{RU2RU}+T_{RUL1}+T_{UL1} \qquad (\text{Eq. 5})$$

Among the parameters in the first propagation equation, the second downlink propagation delay ($T_{DL2}$), the RU-to-RU propagation delay ($T_{RU2RU}$), and the first uplink propagation delay ($T_{UL1}$) are unknown. The first delay ($T_{DELAY1}$) is known based on the settings of the first delay circuit 338. The first remote unit downlink propagation delay ($T_{RDL1}$) and the second remote unit uplink propagation delay ($T_{RUL2}$) can be measured at the first remote unit 1004(1) and the second remote unit 1004(2) during a testing or a commissioning stage.

With continuing reference to FIG. 10, in a non-limiting example, the central unit 1002 includes the second E/O converter 348 and the first O/E converter 350. The second E/O converter 348 is configured to receive the modulated signal 328 from the second downlink circuit 306(2) to generate the optical modulated signal 328'. The second E/O converter 348 provides the optical modulated signal 328' to the second downlink interface 310(2) over the second optical fiber-based downlink communications medium 312'(2). The second remote unit 1004(2) includes the second remote unit O/E converter 354(2) configured to receive the optical modulated signal 328' from the second downlink interface 310(2). The second remote unit O/E converter 354(2) converts the optical modulated signal 328' into the modulated signal 328 and provides the modulated signal 328 to the second remote unit downlink circuit 342(2) via switch S11. The first remote unit 1004(1) includes the first remote unit E/O converter 356(1) configured to receive the modulated signal 328 from the first remote unit uplink circuit 344(1). The first remote unit E/O converter 356(1) converts the modulated signal 328 into the optical modulated signal 328' and provides the optical modulated signal 328' to the first uplink interface 314(1). The first O/E converter 350 in the central unit 1002 is configured to receive the optical modulated signal 328' from the first uplink interface 314(1) over the first optical fiber-based uplink communications medium 316'(1). The first O/E converter 350 converts the optical modulated signal 328' into the modulated signal 328. The first O/E converter 350 provides the modulated signal 328 to the first uplink circuit 308(1).

With reference back to FIG. 3, the controller 330 is configured to generate the five propagation delay equations (Eq. 1 to Eq. 5) for determining the first downlink propagation delay ($T_{DL1}$), the first uplink propagation delay ($T_{UL1}$), the second downlink propagation delay ($T_{DL2}$), the second uplink propagation delay ($T_{UL2}$), and the RU-to-RU propagation delay ($T_{RU2RU}$) according to a propagation delay determination process. In this regard, FIGS. 11A-11E illustrate an exemplary propagation delay determination process 1100 that can be employed by the controller 330 in the WDS 300 of FIG. 3, the WDS 600 of FIG. 6, the WDS 700 of FIG. 7, the WDS 800 of FIG. 8, the WDS 900 of FIG. 9, and the WDS 1000 of FIG. 10 to determine the first propagation delay equation (Eq.1), the second propagation delay equation (Eq. 2), the third propagation delay equation (Eq. 3), the fourth propagation delay equation (Eq. 4), and the fifth propagation delay equation (Eq. 5).

Figure 11A:
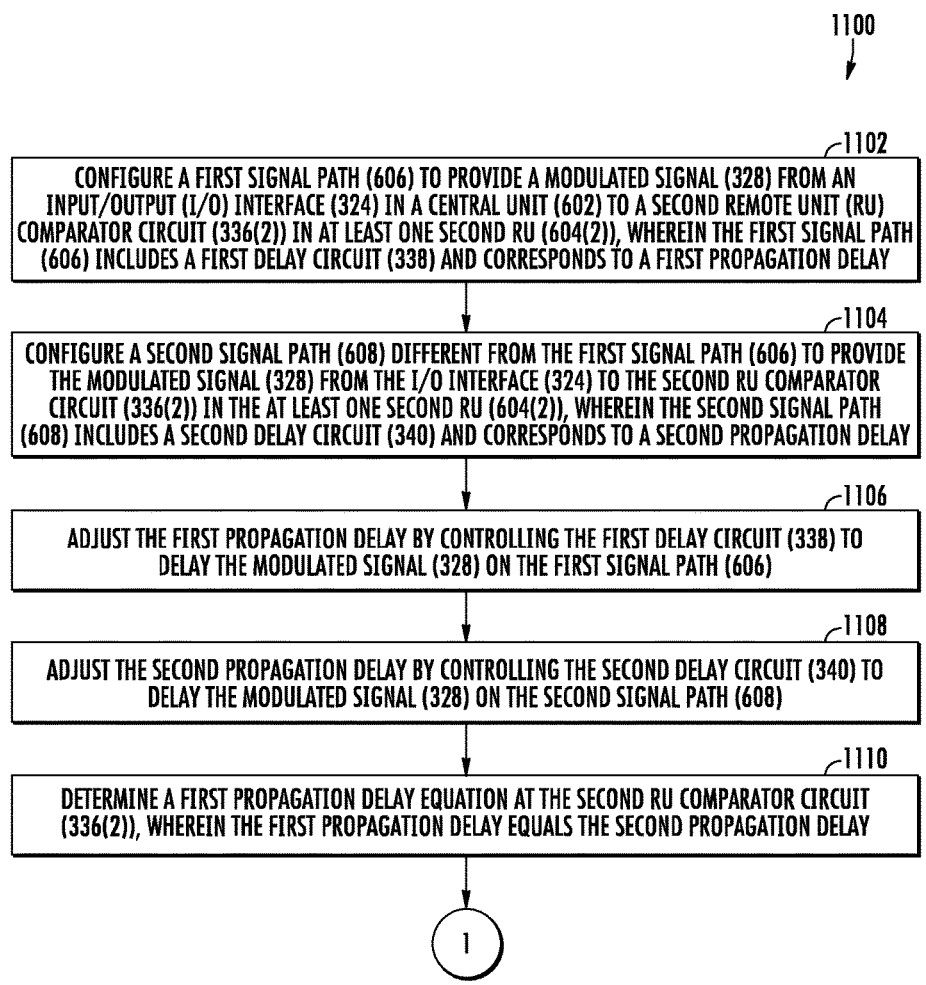
FIGS. 11A-11E illustrate an exemplary propagation delay determination process that can be employed by a controller in the WDSs of FIGS. 3 and 6-10 to determine the first propagation delay equation, the second propagation delay equation, the third propagation delay equation, the fourth propagation delay equation, and the fifth propagation delay equation, of FIGS. 6-10, respectively.

With reference to FIG. 11A, the controller 330 configures the first signal path 606 to provide the modulated signal 328 from the I/O interface 324 in the central unit 602 to the second remote unit comparator circuit 336(2) in the second remote unit 604(2). The first signal path 606 includes the first delay circuit 338 and corresponds to the first propagation delay (block 1102). The controller 330 also configures the second signal path 608, which is different from the first signal path 606, to provide the modulated signal 328 from the I/O interface 324 to the second remote unit comparator circuit 336(2) in the second remote unit 604(2). The second signal path 608 includes the second delay circuit 340 and corresponds to the second propagation delay (block 1104).

The controller 330 adjusts the first propagation delay by controlling the first delay circuit 338 to delay the modulated signal 328 on the first signal path 606 (block 1106). The controller 330 also adjusts the second propagation delay by controlling the second delay circuit 340 to delay the modulated signal 328 on the second signal path 608 (block 1108). The controller 330 determines the first propagation delay equation (Eq. 1) at the second remote unit comparator circuit 336(2). In the first propagation delay equation (Eq. 1), the first propagation delay equals the second propagation delay (block 1110).

Figure 11B:
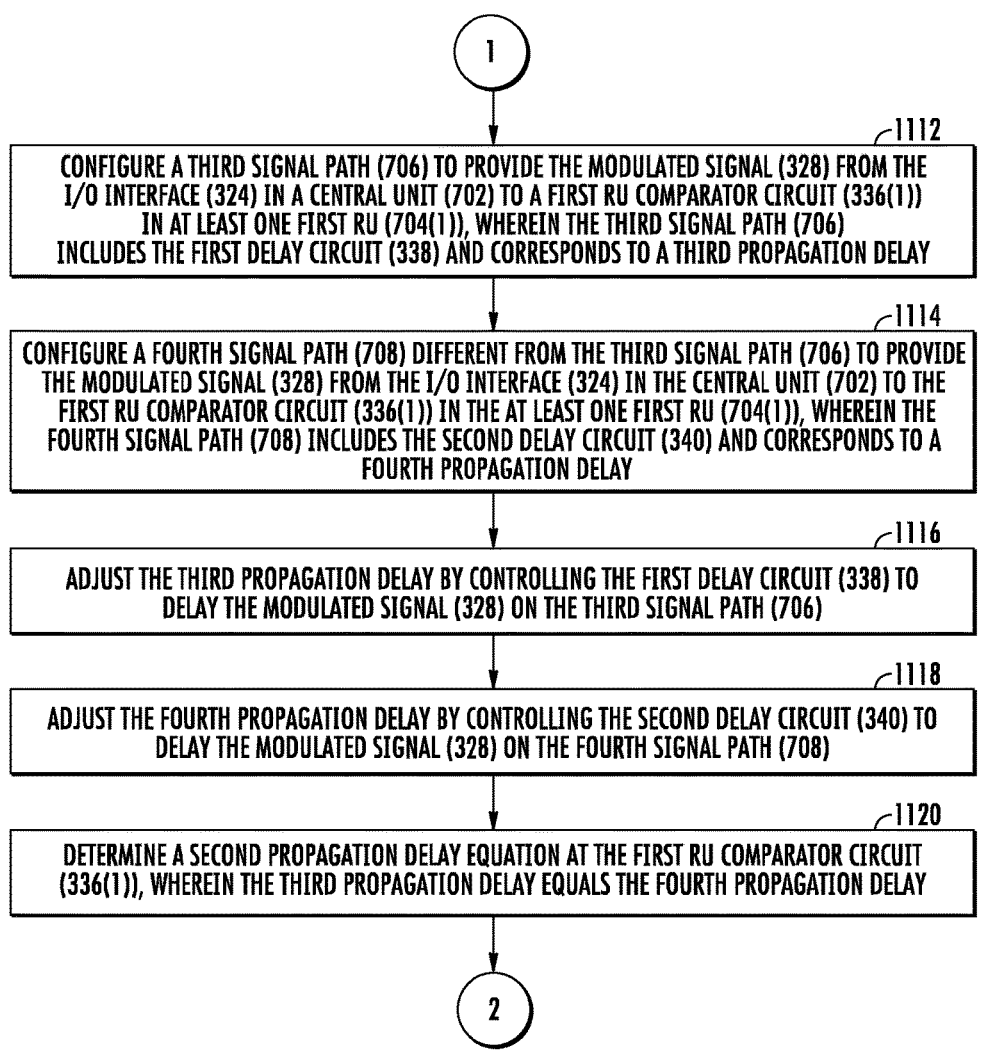

With reference to FIG. 11B, the controller 330 configures the third signal path 706 to provide the modulated signal 328 from the I/O interface 324 in the central unit 702 to the first remote unit comparator circuit 336(1) in the first remote unit 704(1). The third signal path 706 includes the first delay circuit 338 and corresponds to the third propagation delay (block 1112). The controller 330 also configures the fourth signal path 708, which is different from the third signal path 706, to provide the modulated signal 328 from the I/O interface 324 in the central unit 702 to the first remote unit comparator circuit 336(1) in the first remote unit 704(1). The fourth signal path 708 includes the second delay circuit 340 and corresponds to the fourth propagation delay (block 1114). The controller 330 adjusts the third propagation delay by controlling the first delay circuit 338 to delay the modulated signal 328 on the third signal path 706 (block 1116). The controller 330 also adjusts the fourth propagation delay by controlling the second delay circuit 340 to delay the modulated signal 328 on the fourth signal path 708 (block 1118). The controller 330 determines the second propagation delay equation (Eq. 2) at the first remote unit comparator circuit 336(1). In the second propagation delay equation (Eq. 2), the third propagation delay equals the fourth propagation delay (block 1120).

Figure 11C:
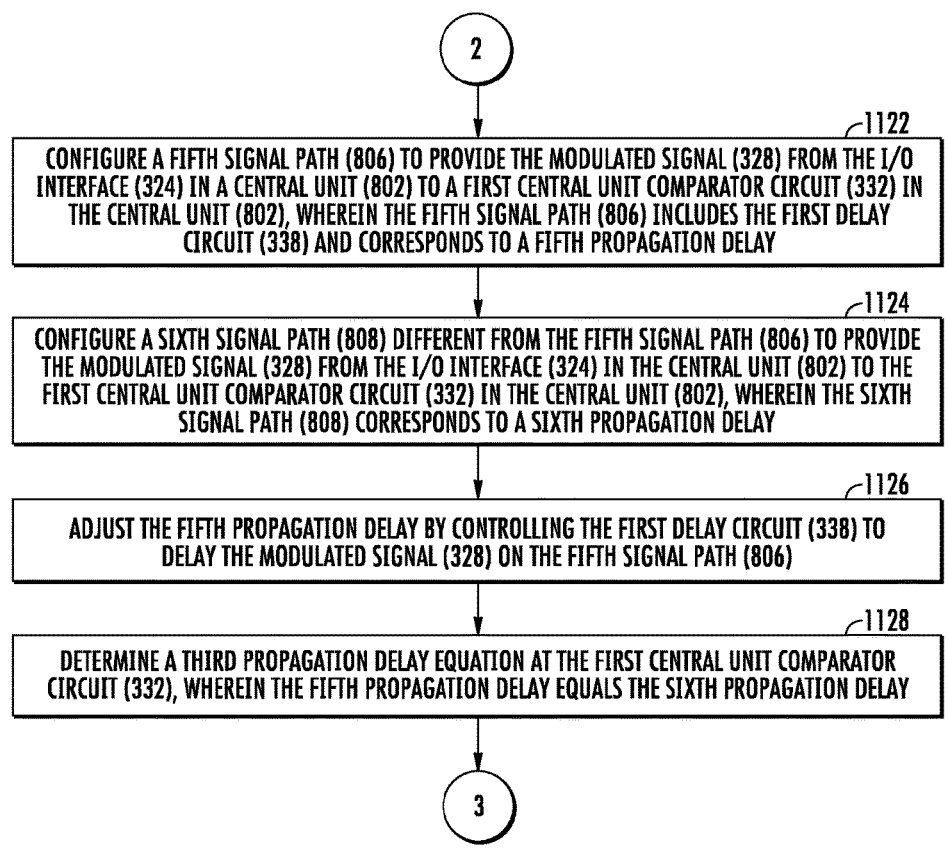

With reference to FIG. 11C, the controller 330 configures the fifth signal path 806 to provide the modulated signal 328 from the I/O interface 324 in the central unit 802 to the first central unit comparator circuit 332 in the central unit 802. The fifth signal path 806 includes the first delay circuit 338 and corresponds to the fifth propagation delay (block 1122). The controller 330 configures the sixth signal path 808, which is different from the fifth signal path 806, to provide the modulated signal 328 from the I/O interface 324 in the central unit 802 to the first central unit comparator circuit 332 in the central unit 802. The sixth signal path 808 corresponds to the sixth propagation delay (block 1124). The controller 330 adjusts the fifth propagation delay by controlling the first delay circuit 338 to delay the modulated signal 328 on the fifth signal path 806 (block 1126). The controller 330 determines the third propagation delay equation (Eq. 3) at the first central unit comparator circuit 332. In the third propagation delay equation (Eq. 3), the fifth propagation delay equals the sixth propagation delay (block 1128).

Figure 11D:
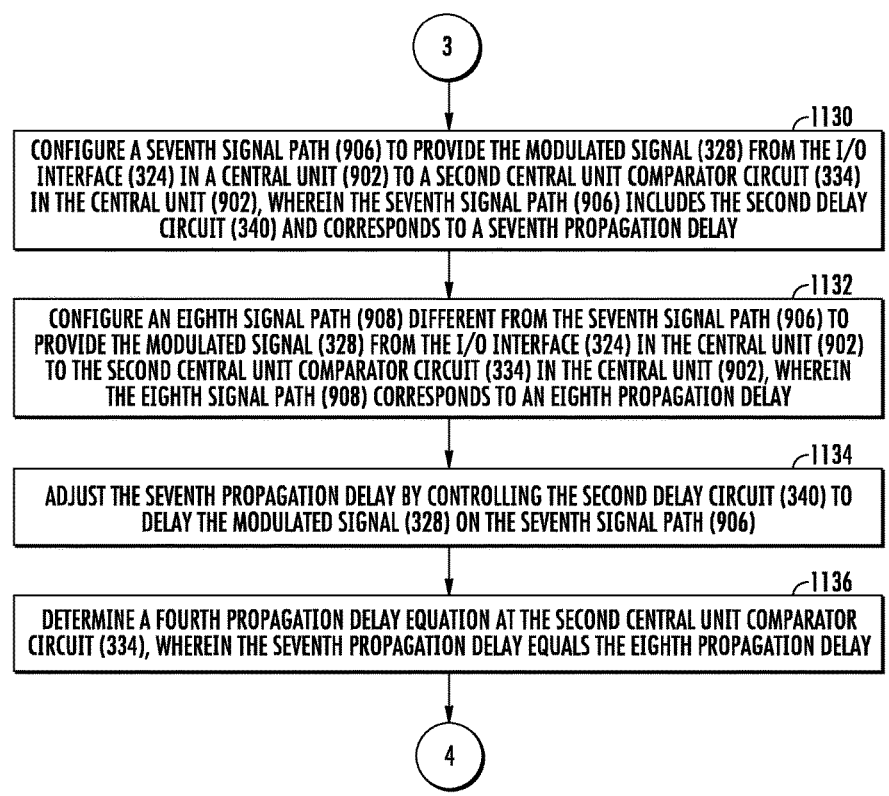

With reference to FIG. 11D, the controller 330 configures the seventh signal path 906 to provide the modulated signal 328 from the I/O interface 324 in the central unit 902 to the second central unit comparator circuit 334 in the central unit 902. The seventh signal path 906 includes the second delay circuit 340 and corresponds to the seventh propagation delay (block 1130). The controller 330 also configures the eighth signal path 908, which is different from the seventh signal path 906, to provide the modulated signal 328 from the I/O interface 324 in the central unit 902 to the second central unit comparator circuit 334 in the central unit 902. The eighth signal path 908 corresponds to the eighth propagation delay (block 1132). The controller 330 adjusts the seventh propagation delay by controlling the second delay circuit 340 to delay the modulated signal 328 on the seventh signal path 906 (block 1134). The controller 330 determines the fourth propagation delay equation (Eq. 4) at the second central unit comparator circuit 334. In the fourth propagation delay equation (Eq. 4), the seventh propagation delay equals the eighth propagation delay (block 1136).

Figure 11E:
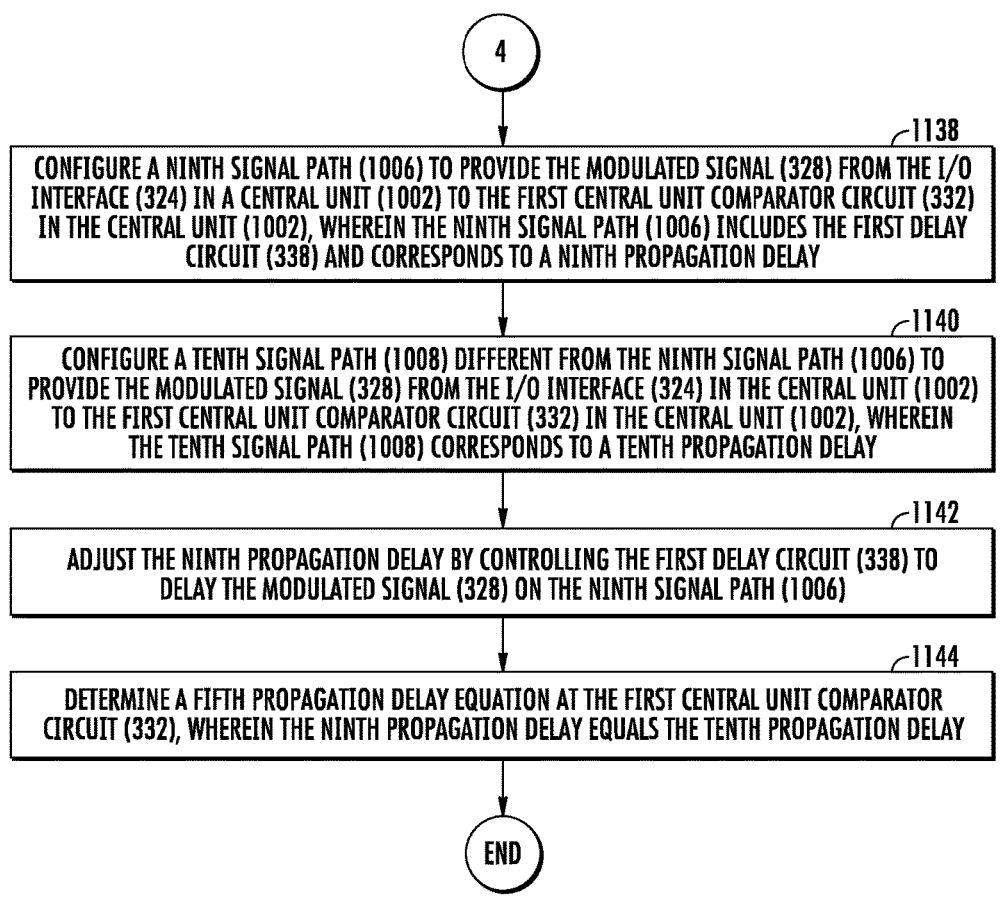

With continuing reference to FIG. 11E, the controller 330 configures the ninth signal path 1006 to provide the modulated signal 328 from the I/O interface 324 in the central unit 1002 to the first central unit comparator circuit 332 in the central unit 1002. The ninth signal path 1006 includes the first delay circuit 338 and corresponds to the ninth propagation delay (block 1138). The controller 330 also configures the tenth signal path 1008, which is different from the ninth signal path 1006, to provide the modulated signal 328 from the I/O interface 324 in the central unit 1002 to the first central unit comparator circuit 332 in the central unit 1002. The tenth signal path 1008 corresponds to the tenth propagation delay (block 1140). The controller 330 adjusts the ninth propagation delay by controlling the first delay circuit 338 to delay the modulated signal 328 on the ninth signal path 1006 (block 1142). The controller 330 determines the fifth propagation delay equation (Eq. 5) at the first central unit comparator circuit 332. In the fifth propagation delay equation (Eq. 5), the ninth propagation delay equals the tenth propagation delay (block 1144).

Figure 12:
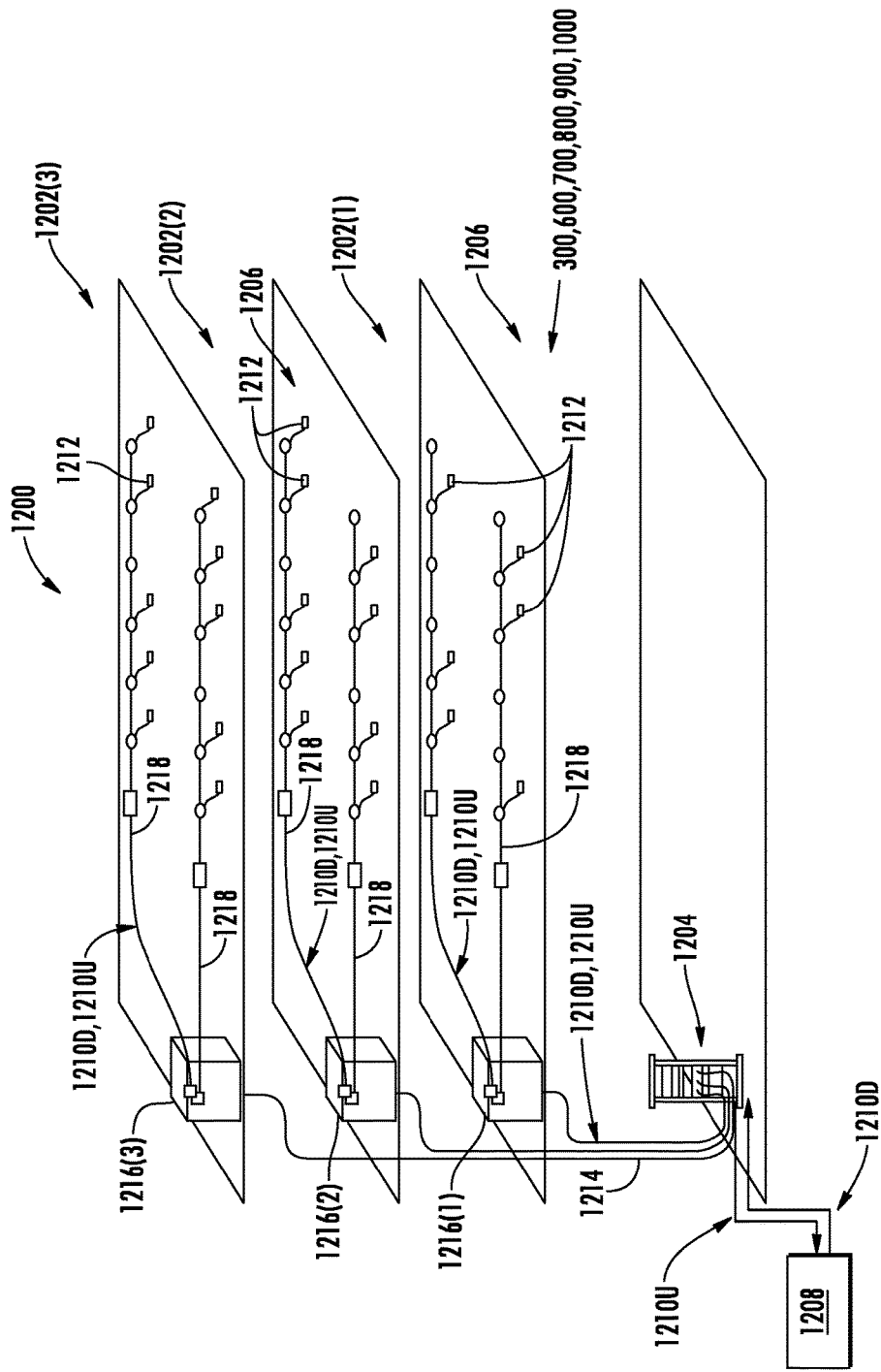
FIG. 12 is a partial schematic cut-away diagram of an exemplary building infrastructure in which the WDSs of FIGS. 3 and 6-10 can be provided.

The WDS 300 of FIG. 3, the WDS 600 of FIG. 6, the WDS 700 of FIG. 7, the WDS 800 of FIG. 8, the WDS 900 of FIG. 9, and the WDS 1000 of FIG. 10, which are configured to determine propagation delays in the WDS 300, can be provided in an indoor environment, as illustrated in FIG. 12. FIG. 12 is a partial schematic cut-away diagram of an exemplary building infrastructure 1200 in which WDS 300 of FIG. 3, the WDS 600 of FIG. 6, the WDS 700 of FIG. 7, the WDS 800 of FIG. 8, the WDS 900 of FIG. 9, and the WDS 1000 of FIG. 10 can be employed. The building infrastructure 1200 in this embodiment includes a first (ground) floor 1202(1), a second floor 1202(2), and a third floor 1202(3). The floors 1202(1)-1202(3) are serviced by a central unit 1204 to provide antenna coverage areas 1206 in the building infrastructure 1200. The central unit 1204 is communicatively coupled to a base station 1208 to receive downlink communications signals 1210D from the base station 1208. The central unit 1204 is communicatively coupled to a plurality of remote units 1212 to distribute the downlink communications signals 1210D to the plurality of remote units 1212 and to receive uplink communications signals 1210U from the plurality of remote units 1212, as previously discussed above. The downlink communications signals 1210D and the uplink communications signals 1210U communicated between the central unit 1204 and the plurality of remote units 1212 are carried over a riser cable 1214. The riser cable 1214 may be routed through interconnect units (ICUs) 1216(1)-1216(3) dedicated to each of the floors 1202(1)-1202(3) that route the downlink communications signals 1210D and the uplink communications signals 1210U to the plurality of remote units 1212 and also provide power to the plurality of remote units 1212 via array cables 1218.

Figure 13:
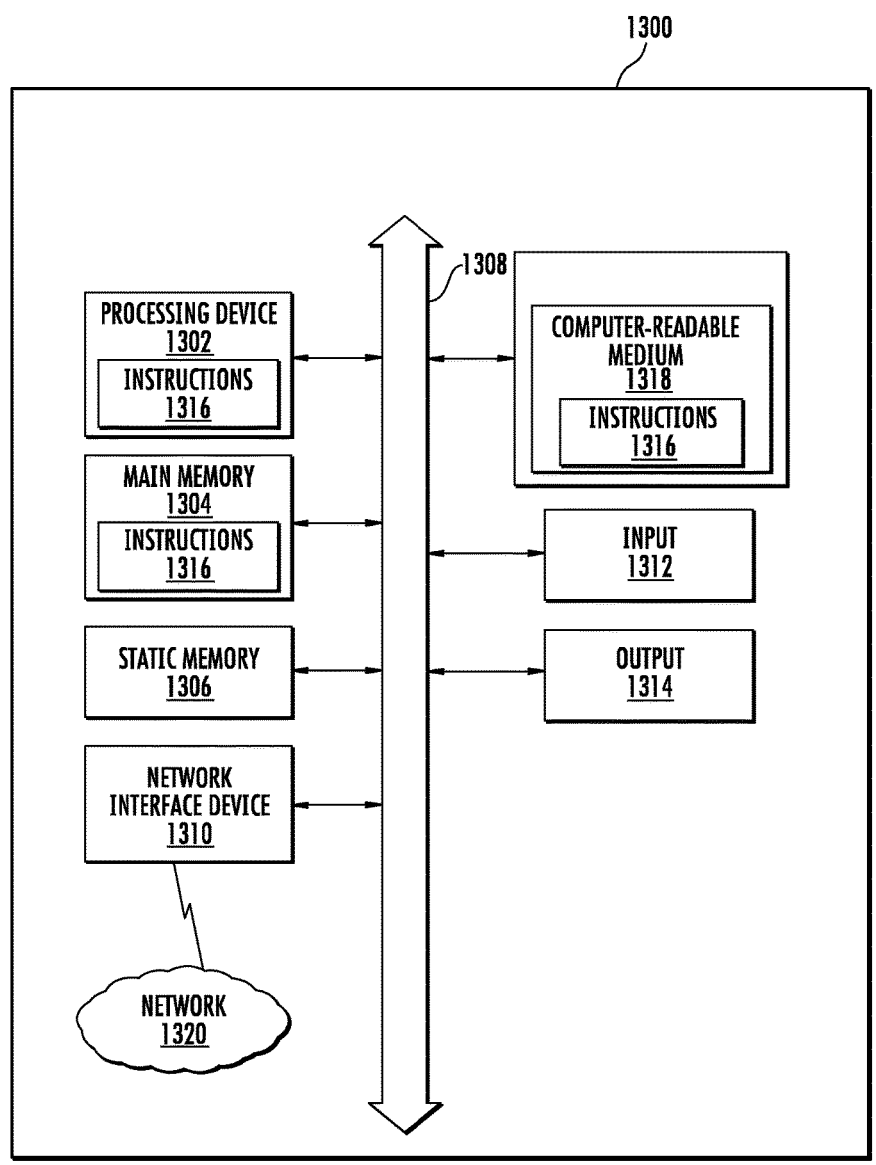
FIG. 13 is a schematic diagram representation of additional detail illustrating an exemplary computer system that could be employed in a controller, including a controller in the WDSs of FIGS. 3 and 6-10, for determining propagation delays without assuming that downlink propagation delay and uplink propagation delay are symmetric.

FIG. 13 is a schematic diagram representation of additional detail illustrating an exemplary computer system 1300 that could be employed in a controller, including the controller 330 in WDS 300 of FIG. 3, the WDS 600 of FIG. 6, the WDS 700 of FIG. 7, the WDS 800 of FIG. 8, the WDS 900 of FIG. 9, and the WDS 1000 of FIG. 10 for determining propagation delays in the WDS 300. In this regard, the computer system 1300 is adapted to execute instructions from an exemplary computer-readable medium to perform these and/or any of the functions or processing described herein.

In this regard, the computer system 1300 in FIG. 13 may include a set of instructions that may be executed to predict frequency interference to avoid or reduce interference in a multi-frequency DAS. The computer system 1300 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1300 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1300 in this embodiment includes a processing device or processor 1302, a main memory 1304 (e.g., read-only memory (ROM), flash memory, dynamic random access memory (DRAM), such as synchronous DRAM (SDRAM), etc.), and a static memory 1306 (e.g., flash memory, static random access memory (SRAM), etc.), which may communicate with each other via a data bus 1308. Alternatively, the processor 1302 may be connected to the main memory 1304 and/or static memory 1306 directly or via some other connectivity means. The processor 1302 may be a controller, and the main memory 1304 or static memory 1306 may be any type of memory.

The processor 1302 represents one or more general-purpose processing devices, such as a microprocessor, central processing unit, or the like. More particularly, the processor 1302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1302 is configured to execute processing logic in instructions for performing the operations and steps discussed herein.

The computer system 1300 may further include a network interface device 1310. The computer system 1300 also may or may not include an input 1312, configured to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processor 1302 during execution thereof by the computer system 1300, the main memory 1304 and the processor 1302 also constituting computer-readable medium. The instructions 1316 may further be transmitted or received over a network 1320 via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for determining propagation delays from a central unit to at least one first remote unit and at least one second remote unit in a wireless distribution system (WDS), comprising:

determining a first downlink propagation delay between an input/output (I/O) interface in the central unit and the at least one first remote unit;

determining a first uplink propagation delay between the I/O interface in the central unit and the at least one first remote unit;

determining a second downlink propagation delay between the I/O interface in the central unit and the at least one second remote unit;

determining a second uplink propagation delay between the I/O interface in the central unit and the at least one second remote unit; and determining a remote unit-to-remote unit (RU-to-RU) propagation delay between the at least one first remote unit and the at least one second remote unit.

2. The method of claim 1, further comprising:
determining one or more propagation delay equations, each of the one or more propagation delay equations comprising at least one variable selected among the first downlink propagation delay, the first uplink propagation delay, the second downlink propagation delay, the second uplink propagation delay, and the RU-to-RU propagation delay; and
mathematically solving the one or more propagation delay equations to determine the first downlink propagation delay, the first uplink propagation delay, the second downlink propagation delay, the second uplink propagation delay, and the RU-to-RU propagation delay.

3. The method of claim 2, further comprising determining locations of one or more client devices in the WDS based on the first downlink propagation delay, the first uplink propagation delay, the second downlink propagation delay, the second uplink propagation delay, and the RU-to-RU propagation delay.

4. The method of claim 2, further comprising determining locations of one or more client devices in the WDS based on the first downlink propagation delay, the first uplink propagation delay, the second downlink propagation delay, the second uplink propagation delay, and timing advances (TAs) determined for the one or more client devices.

5. The method of claim 2, wherein the at least one first remote unit comprises at least one electrical-to-optical converter and at least one optical-to-electrical converter.

6. The method of claim 1, further comprising:
configuring a first signal path to provide a modulated signal from the I/O interface in the central unit to a second remote unit comparator circuit in the at least one second remote unit, wherein the first signal path comprises a first delay circuit and corresponds to a first propagation delay; and
configuring a second signal path different from the first signal path to provide the modulated signal from the I/O interface to the second remote unit comparator circuit in the at least one second remote unit, wherein the second signal path comprises a second delay circuit and corresponds to a second propagation delay.

7. The method of claim 6, further comprising:
adjusting the first propagation delay by controlling the first delay circuit to delay the modulated signal on the first signal path;
adjusting the second propagation delay by controlling the second delay circuit to delay the modulated signal on the second signal path;
determining a first propagation delay equation at the second remote unit comparator circuit, wherein the first propagation delay equals the second propagation delay;
configuring a third signal path to provide the modulated signal from the I/O interface in the central unit to a first remote unit comparator circuit in the at least one first remote unit, wherein the third signal path comprises the first delay circuit and corresponds to a third propagation delay; and
configuring a fourth signal path different from the third signal path to provide the modulated signal from the I/O interface in the central unit to the first remote unit comparator circuit in the at least one first remote unit, wherein the fourth signal path comprises the second delay circuit and corresponds to a fourth propagation delay.

8. The method of claim 7, further comprising:
adjusting the third propagation delay by controlling the first delay circuit to delay the modulated signal on the third signal path;
adjusting the fourth propagation delay by controlling the second delay circuit to delay the modulated signal on the fourth signal path; and
determining a second propagation delay equation at the first remote unit comparator circuit, wherein the third propagation delay equals the fourth propagation delay.

9. The method of claim 8, further comprising:
configuring a fifth signal path to provide the modulated signal from the I/O interface in the central unit to a first central unit comparator circuit in the central unit, wherein the fifth signal path comprises the first delay circuit and corresponds to a fifth propagation delay;
configuring a sixth signal path different from the fifth signal path to provide the modulated signal from the I/O interface in the central unit to the first central unit comparator circuit in the central unit, wherein the sixth signal path corresponds to a sixth propagation delay;
adjusting the fifth propagation delay by controlling the first delay circuit to delay the modulated signal on the fifth signal path; and
determining a third propagation delay equation at the first central unit comparator circuit, wherein the fifth propagation delay equals the sixth propagation delay.

10. The method of claim 9, further comprising:
configuring a seventh signal path to provide the modulated signal from the I/O interface in the central unit to a second central unit comparator circuit in the central unit, wherein the seventh signal path comprises the second delay circuit and corresponds to a seventh propagation delay;
configuring an eighth signal path different from the seventh signal path to provide the modulated signal from the I/O interface in the central unit to the second central unit comparator circuit in the central unit, wherein the eighth signal path corresponds to an eighth propagation delay;
adjusting the seventh propagation delay by controlling the second delay circuit to delay the modulated signal on the seventh signal path;
determining a fourth propagation delay equation at the second central unit comparator circuit, wherein the seventh propagation delay equals the eighth propagation delay;
configuring a ninth signal path to provide the modulated signal from the I/O interface in the central unit to the first central unit comparator circuit in the central unit, wherein the ninth signal path comprises the first delay circuit and corresponds to a ninth propagation delay; and
configuring a tenth signal path different from the ninth signal path to provide the modulated signal from the I/O interface in the central unit to the first central unit comparator circuit in the central unit, wherein the tenth signal path corresponds to a tenth propagation delay.

11. The method of claim 10, further comprising:
adjusting the ninth propagation delay by controlling the first delay circuit to delay the modulated signal on the ninth signal path; and
determining a fifth propagation delay equation at the first central unit comparator circuit, wherein the ninth propagation delay equals the tenth propagation delay.

12. The method of claim 11, further comprising:
- determining the first propagation delay equation that comprises the first downlink propagation delay, the second downlink propagation delay, and the RU-to-RU propagation delay;
- determining the second propagation delay equation that comprises the first downlink propagation delay, the second downlink propagation delay, and the RU-to-RU propagation delay;
- determining the third propagation delay equation that comprises the first downlink propagation delay and the first uplink propagation delay;
- determining the fourth propagation delay equation that comprises the second downlink propagation delay and the second uplink propagation delay; and
- determining the fifth propagation delay equation that comprises the second downlink propagation delay, the RU-to-RU propagation delay, and the first uplink propagation delay.

13. The method of claim 12, further comprising determining the first downlink propagation delay, the first uplink propagation delay, the second downlink propagation delay, the second uplink propagation delay, and the RU-to-RU propagation delay by mathematically solving the first propagation delay equation, the second propagation delay equation, the third propagation delay equation, the fourth propagation delay equation, and the fifth propagation delay equation.

14. The method of claim 1, wherein the at least one first remote unit comprises at least one electrical-to-optical converter and at least one optical-to-electrical converter.

15. The method of claim 14, further comprising determining the first downlink propagation delay that is different from the first uplink propagation delay.

16. The method of claim 14, further comprising determining the second downlink propagation delay that is different from the second uplink propagation delay.

17. The method of claim 1, further comprising determining locations of one or more client devices in the WDS based on the first downlink propagation delay, the first uplink propagation delay, the second downlink propagation delay, the second uplink propagation delay, and the RU-to-RU propagation delay.

18. The method of claim 17, wherein the at least one first remote unit comprises at least one electrical-to-optical converter and at least one optical-to-electrical converter.

19. The method of claim 1, further comprising determining locations of one or more client devices in the WDS based on the first downlink propagation delay, the first uplink propagation delay, the second downlink propagation delay, the second uplink propagation delay, and timing advances (TAs) determined for the one or more client devices.

20. The method of claim 19, wherein the at least one first remote unit comprises at least one electrical-to-optical converter and at least one optical-to-electrical converter.

* * * * *